(12) United States Patent
Kang et al.

(10) Patent No.: US 11,044,084 B2
(45) Date of Patent: Jun. 22, 2021

(54) METHOD FOR UNIFIED NETWORK AND SERVICE AUTHENTICATION BASED ON ID-BASED CRYPTOGRAPHY

(71) Applicant: HUAWEI INTERNATIONAL PTE. LTD., Singapore (SG)

(72) Inventors: Xin Kang, Singapore (SG); Haiguang Wang, Singapore (SG); Jie Shi, Singapore (SG); Guilin Wang, Singapore (SG); Yanjiang Yang, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 277 days.

(21) Appl. No.: 16/254,205

(22) Filed: Jan. 22, 2019

(65) Prior Publication Data

US 2019/0158283 A1 May 23, 2019

Related U.S. Application Data

(63) Continuation of application No. PCT/SG2017/050162, filed on Mar. 28, 2017.

(30) Foreign Application Priority Data

Jul. 22, 2016 (SG) .............................. 10201606061P

(51) Int. Cl.
*H04L 9/08* (2006.01)
*H04L 9/32* (2006.01)
(Continued)

(52) U.S. Cl.
CPC .......... *H04L 9/0861* (2013.01); *H04L 9/0869* (2013.01); *H04L 9/30* (2013.01);
(Continued)

(58) Field of Classification Search
CPC ... H04L 9/0861; H04L 9/3073; H04L 9/3242; H04L 9/0869; H04L 9/30; H04L 9/3247;
(Continued)

(56) References Cited

U.S. PATENT DOCUMENTS 6,373,946 B1 * 4/2002 Johnston ............... H04W 12/03
380/211
7,266,435 B2 * 9/2007 Wang ..................... G07C 5/008
455/420

(Continued)

FOREIGN PATENT DOCUMENTS

CN 102420808 A 4/2012
CN 102480354 A 5/2012
(Continued)

OTHER PUBLICATIONS

Boyd et al.,"Key Agreement Using Statically Keyed Authenticators", ACNS 2004, LNCS 3089, pp. 248-262 (2004).
(Continued)

*Primary Examiner* — Matthew Smithers
*Assistant Examiner* — Mirza Israr Javed
(74) *Attorney, Agent, or Firm* — Leydig, Voit & Mayer, Ltd.

(57) ABSTRACT

This disclosure relates to a unified authentication method for a device to authenticate an operator provider network and a service provider network based on Identity-Based Cryptography where each of the device, operator provider network and service provider network has a different private key and a same Global Public Key (GPK) issued by a public key generator, the unified authentication method comprising: the device, generating and transmitting an authentication data package to the operator provider network, in response to receiving the authentication data package, determining a type of authentication based on the Authentication Type; the
(Continued)

element of the operator provider network, in response to determining the first type of authentication, generating and transmitting a first Authentication Response Message to the device and transmitting the authentication data package to the element of the service provider network based on the SP_ID.

20 Claims, 13 Drawing Sheets

(51) Int. Cl.
  *H04L 29/06* (2006.01)
  *H04L 9/30* (2006.01)
  *H04W 12/041* (2021.01)
  *H04W 12/069* (2021.01)

(52) U.S. Cl.
  CPC .......... *H04L 9/3073* (2013.01); *H04L 9/3242* (2013.01); *H04L 9/3247* (2013.01); *H04L 63/061* (2013.01); *H04W 12/041* (2021.01); *H04W 12/069* (2021.01); *H04L 2209/80* (2013.01)

(58) Field of Classification Search
  CPC .............. H04L 63/061; H04L 2209/80; H04W 12/0401; H04W 12/0609
  See application file for complete search history.

(56) References Cited

U.S. PATENT DOCUMENTS

| | | | | |
|---|---|---|---|---|
| 7,542,569 | B1* | 6/2009 | Leiwo ................. | H04L 63/0428 380/247 |
| 10,930,136 | B2* | 2/2021 | Baum .................... | H04L 12/66 |
| 10,931,447 | B2* | 2/2021 | Moriyama ............ | H04L 9/0869 |
| 2005/0135610 | A1* | 6/2005 | Chen .................... | H04L 9/3247 380/30 |
| 2006/0026426 | A1* | 2/2006 | Chen .................... | H04L 9/3073 713/168 |
| 2006/0177051 | A1* | 8/2006 | Lauter .................. | H04L 9/3247 380/28 |
| 2010/0031042 | A1 | 2/2010 | Di Crescenzo et al. | |
| 2011/0173450 | A1* | 7/2011 | Knobbe ............. | H04W 12/041 713/171 |
| 2014/0053241 | A1* | 2/2014 | Norrman ............. | H04L 63/0876 726/3 |
| 2019/0058701 | A1* | 2/2019 | Wu ........................... | H04L 9/08 |
| 2019/0158283 | A1* | 5/2019 | Kang .................... | H04L 9/3247 |

FOREIGN PATENT DOCUMENTS

| | | |
|---|---|---|
| CN | 103188080 A | 7/2013 |
| CN | 103259667 A | 8/2013 |
| CN | 103532720 A | 1/2014 |
| CN | 104717648 A | 6/2015 |
| CN | 105530099 A | 4/2016 |
| CN | 105743646 A | 7/2016 |
| CN | 105790941 A | 7/2016 |

OTHER PUBLICATIONS

Smart, "Identity-based authenticated key agreement protocol based on Weil pairing," Electronics Letters (vol. 38, Issue:13, pp. 1-2 (Jun. 20, 2002).
Peterson, "ID-based Signatures from Pairings on Elliptic Curves," Information Security Group, Mathematics Department, Royal Holloway University of London, Egham,UK., pp. 1-4 (Jan. 22, 2002).
Boneh et al.,"Identity-Based Encryption from the Weil Pairing," pp. 1-31 (Jan. 1, 2003).
Menezes et al.,"Handbook of Applied Cryptography," Chapter 12 Key Establishment Protocols, pp. 1-54, XP001525012, 1997 by CRC Press, Inc. (1996).
CN/201780028149.2, Office/Search Report, Jan. 4, 2021.

* cited by examiner

METHOD FOR UNIFIED NETWORK AND SERVICE AUTHENTICATION BASED ON ID-BASED CRYPTOGRAPHY

CROSS-REFERENCE TO RELATED APPLICATIONS

This application is a continuation of International Application No. PCT/SG2017/050162, filed on Mar. 28, 2017, which claims priority to Singapore Patent Application No. 10201606061P, filed on Jul. 22, 2016. The disclosures of the aforementioned applications are hereby incorporated by reference in their entireties.

FIELD

This disclosure relates to a method and system of an authentication framework between an operator provider and a service provider. Particularly, this disclosure relates to a method and system of a unified authentication framework between an operator provider and a service provider based on ID-Based cryptography.

SUMMARY OF THE PRIOR ART

In current 3G/4G cellular networks, mutual authentications are employed between User Equipment (UE) and networks, to protect mobile devices and networks from being eavesdropped or manipulated during data communication. The current mutual authentication protocol employed by 3G/4G is Authentication and Key Agreement (AKA). To perform AKA, the UE and the Core Network (CN) are required to have some pre-shared confidential information kept on both sides.

In 3G/4G networks, at the network side, the credentials are kept in servers named Home Subscriber Server (HSS); while at the UE side, the credentials are kept in an isolated device named Universal Subscriber Identity Module (USIM) card. The USIM card is a computing device embedded in a USIM slot inside a UE. USIM and UE can exchange information via a special interface. Currently, 3G/4G networks use symmetric keys in the mutual authentication. Hence, for a given International Mobile Subscriber Identification (IMSI), the credentials kept in the corresponding USIM and HSS are the same.

When UE wants to access network and transmits and receives data, the UE has to perform mutual authentication with the CN based on AKA. The AKA procedure illustrated in FIG. 1 is referred to as the network access authentication. In the AKA procedure, the UE first sends an Attach Request to the Mobility Management Entity (MME). In response to receiving the Attach Request, the MME forwards the Attach Request to the HSS which subsequently generates an authentication vector based on the credentials shared with the UE. The authentication vectors are sent to the MME which subsequently sends an authentication data response containing authentication material to the UE. The UE authenticates the network and then sends a user authentication containing authentication code to the MME. The MME then verifies the authentication code and authenticates the UE. After authentication, the UE exchanges key material with the MME and eNB to further generate session keys for control and data plane.

In conventional communication systems, when a user wants to use any 3rd party service, it has to do the service authentication. Usually, the service authentication is based on "username+password", whose security level is much lower than the network access authentication. A user must first do the network access authentication and then do the service authentication in order to use the service. Thus, two authentication systems must be maintained to provide such kind of authentication services.

Hence, those skilled in the art are striving to provide a better authentication system and method for a user to authenticate with both operator provider and service provider.

SUMMARY

The above and other problems are solved and an advance in the art is made by systems and methods provided by embodiments in accordance with the disclosure. A first advantage of embodiments of systems and methods in accordance with the disclosure is that only one authentication message is required to authenticate both the cellular network and the service provider, which greatly facilitates the user and reduces the network overhead. A second advantage of embodiments of systems and methods in accordance with the disclosure is that the unified network and service authentication framework achieves the same security level as the network authentication, which is much higher than the service authentication.

In accordance with an aspect of the disclosure, a unified authentication method for a device to authenticate a first provider network and a second provider network based on Identity-Based Cryptography where each of the device, first provider network and second provider network has a different private key and a same Global Public Key (GPK) issued by a public key generator is provided in the following manner. The unified authentication method comprises: the device, generating and transmitting an authentication data package to the first provider network, the authentication data package includes an Authentication Type (Auth. Type), and the second Provider network's ID (SP_ID), wherein the Auth. Type comprises a first type where authentication involves an element of the first provider network and an element of the second provider network, a second type where authentication involves the element of the first provider network, and a third type where authentication involves the element of the second provider network; the element of the first provider network, in response to receiving the authentication data package, determining a type of authentication based on the Authentication Type; the element of the first provider network, in response to determining the first type of authentication, generating and transmitting a first Authentication Response Message to the device and transmitting the authentication data package to the element of the second provider network based on the SP_ID; and the element of the second provider network, in response to receiving the authentication data package, generating and transmitting a second Authentication Response Message to the device. In accordance with an embodiment of this embodiment, the Sig_De is generated by the device using the secret key of the device and the Global Public Key (GPK). In accordance with an embodiment of this embodiment, the authentication data package further includes a first random number (RAND1), an identity of the device (Device_ID) and a device's signature (Sig_De).

In accordance with an embodiment of the disclosure, the step of generating and transmitting, by the element of the first provider network, the first Authentication Response Message to the device comprises: verifying the Sig_De using the Device_ID and the GPK; and in response to verification being successful, generating a second random number (RAND2). Subsequently, the method generates a first encrypted message m1 containing RAND2 using the Device_ID based on Identity Based Encryption (IBE); generates a signature (Sig_AN) using the secret key of the first provider network and a GPK; and generates and transmit the first Authentication Response Message to the device, wherein the first Authentication Response Message includes an identity of the first provider network (AN_ID), RAND1, m1, and Sig_AN.

In accordance with an embodiment of the disclosure, the method further comprises the device, in response to receiving the first Authentication Response Message, performing the following steps: authenticating the first provider network by verifying Sig_AN using AN_ID and the GPK; in response to authentication being successful, decrypting m1 with the secret key of the device to obtain RAND2; deriving the first session key (K_com) using the pre-defined KDF with input parameters being RAND1 and RAND2; saving the first session key in the memory of the device; generating a first Message Authentication Code (MAC1) using a MAC generation function with RAND2 and K_com as the input; and transmitting MAC1 to the element of the first provider network.

In accordance with an embodiment of the disclosure, the method further comprises the element of the first provider network, in response to receiving the MAC1, performing the following steps: deriving the first session key (K_com) using a pre-defined Key Derivation Function (KDF) with input parameters being RAND1 and RAND2; generating a MAC using the same MAC generation function with RAND2 and K_com as the input; determining whether MAC1 is equal to MAC; and in response to MAC1 being equal to MAC, saving the first session key, K_com, in a memory of the element of the first provider network.

In accordance with an embodiment of the disclosure, the step of generating and transmitting, by the element of the second provider network, the second Authentication Response Message to the device comprises: verifying the Sig_De using the Device_ID and the GPK; and in response to verification being successful, generating a third random number (RAND3); generating a second encrypted message (m2) containing RAND3 using the Device_ID based on IBE; generating a signature (Sig_SP) using the secret key of the second provider network and the GPK; and generating and transmitting the second Authentication Response Message to the device, wherein the second Authentication Response Message includes an identity of the second provider network (SP_ID), RAND1, m2, and Sig_SP.

In accordance with an embodiment of the disclosure, the method further comprises the device, in response to receiving the second Authentication Response Message, performing the following steps: authenticating the second provider network by verifying Sig_SP using SP_ID and the GPK; in response to authentication being successful, decrypting m2 with the secret key of the device to obtain RAND3; deriving a second session key (K_ser) using the pre-defined KDF with input parameters being RAND1 and RAND3; saving the second session key in the memory of the device; generating a second Message Authentication Code (MAC1) using a MAC generation function with RAND3 and K_ser as the input; and transmitting MAC2 to the element of the second provider network.

In accordance with an embodiment of the disclosure, the method further comprises the element of the second provider network, in response to receiving the MAC2, performing the following steps: deriving the second session key (K_ser) using the pre-defined KDF with input parameters being RAND1 and RAND3; generating a MAC using the same MAC generation function with RAND3 and K_ser as the input; determining whether MAC2 is equal to MAC; in response to MAC2 being equal to MAC, saving the second session key, K_ser, in a memory of the element of the second provider network.

In accordance with an embodiment of the disclosure, the method further comprises the element of the first provider network, in response to determining the second type of authentication, generating and transmitting a third Authentication Response Message to the device.

In accordance with an embodiment of the disclosure, the step of generating and transmitting, by the element of the first provider network, the third Authentication Response Message to the device comprises: verifying the Sig_De using the Device_ID and the GPK; in response to verification being successful, generating a second random number (RAND2).

In accordance with an embodiment of the disclosure, the step of generating and transmitting, by the element of the first provider network, the third Authentication Response Message to the device further comprises: generating a first encrypted message m1 containing RAND2 using the Device_ID based on Identity Based Encryption (IBE); generating a signature (Sig_AN) using the secret key of the first provider network and a GPK; and generating and transmitting the third Authentication Response Message to the device, wherein the third Authentication Response Message includes an identity of the first provider network (AN_ID), RAND1, m1, and Sig_AN.

In accordance with an embodiment of the disclosure, the method further comprises the device, in response to receiving the third Authentication Response Message, performing the following steps: authenticating the first provider network by verifying Sig_AN using AN_ID and the GPK; in response to authentication being successful, decrypting m1 with the secret key of the device to obtain RAND2; deriving a session key (K_com) using the pre-defined KDF with input parameters being RAND1 and RAND2; saving the session key in the memory of the device; generating a first Message Authentication Code (MAC1) using a MAC generation function with RAND2 and K_com as the input; and transmitting MAC1 to the element of the first provider network.

In accordance with an embodiment of the disclosure, the method further comprises the element of the first provider network, in response to receiving the MAC1, performing the following steps: deriving the session key (K_com) using a pre-defined Key Derivation Function (KDF) with input parameters being RAND1 and RAND2; generating a MAC using the same MAC generation function with RAND2 and K_com as the input; determining whether MAC1 is equal to MAC; and in response to MAC1 being equal to MAC, saving the session key, K_com, in a memory of the element of the first provider network.

In accordance with an embodiment of the disclosure, the method further comprises the element of the first provider network, in response to determining the third type of authentication, transmitting the authentication data package to the element of the second provider network.

In accordance with an embodiment of the disclosure, the step of generating and transmitting, by the element of the second provider network, the second Authentication Response Message to the device comprises: verifying the Sig_De using the Device_ID and the GPK; in response to verification being successful, generating a third random number (RAND3).

In accordance with an embodiment of the disclosure, the step of generating and transmitting, by the element of the second provider network, the second Authentication Response Message to the device further comprises: generating a second encrypted message (m2) containing RAND3 using the Device_ID based on IBE; generating a signature (Sig_SP) using the secret key of the second provider network and the GPK; and generating and transmitting the second Authentication Response Message to the device, wherein the second Authentication Response Message includes an identity of the second provider network (SP_ID), RAND1, m2, and Sig_SP.

In accordance with an embodiment of the disclosure, the method further comprises the device, in response to receiving the second Authentication Response Message, performing the following steps: authenticating the second provider network by verifying Sig_SP using SP_ID and the GPK; in response to authentication being successful, decrypting m2 with the secret key of the device to obtain RAND3; deriving a second session key (K_ser) using the pre-defined KDF with input parameters being RAND1 and RAND3; saving the second session key in the memory of the device; generating a second Message Authentication Code (MAC1) using a MAC generation function with RAND3 and K_ser as the input; and transmitting MAC2 to the element of the second provider network.

In accordance with an embodiment of the disclosure, the method further comprises the element of the second provider network, in response to receiving the MAC2, performing the following steps: deriving the second session key (K_ser) using the pre-defined KDF with input parameters being RAND1 and RAND3; generating a MAC using the same MAC generation function with RAND3 and K_ser as the input; determining whether MAC2 is equal to MAC; and in response to MAC2 being equal to MAC, saving the second session key, K_ser, in a memory of the element of the second provider network.

In accordance with another aspect of the disclosure, a device for an authentication framework involving the device, a first provider network and a second provider network based on an Identity-Based Cryptography where each of the device, an element of the first provider network and an element of the second provider network has a different private key and a same Global Public Key (GPK) issued by a public key generator, the device comprising: a processor, a memory, and instructions stored on the memory and executable by the processor to: generate an Authentication Type (Auth. Type) wherein the Auth. Type comprises a first type where authentication involves the element of the first provider network and the element of the second provider network, a second type where authentication involves the element of the first provider network, and a third type where authentication involves the element of the second provider network; generate an authentication data package, the authentication data package includes Auth. Type, and a Service Provider network's ID (SP_ID); and transmit the authentication data package to the element of the first provider network. The Sig_De is generated by using the secret key of the device and the GPK.

In accordance with an embodiment of the disclosure, the instructions further comprises instructions to: generate first random number (RAND1); and generate a device's signature (Sig_De); and the authentication data package further includes RAND1, an identity of the device (Device_ID) and Sig_De.

In accordance with an embodiment of the disclosure, the instructions further comprises, in response to the Auth. Type being the first or second type of authentication, instructions to: receive a first Authentication Response Message from the element of the first provider network, wherein the first Authentication Response Message includes an identity of the first provider network (AN_ID), RAND1, a first encrypted message m1 generated by the element of the first provider network containing a second random number (RAND2) using the Device_ID based on Identity Based Encryption (IBE), and a signature (Sig_AN) using the secret key of the first provider network and the GPK; authenticate the first provider network by verifying Sig_AN using AN_ID and the GPK; in response to authentication being successful, decrypt m1 with the secret key of the device to obtain RAND2; derive the first session key (K_com) using the pre-defined KDF with input parameters being RAND1 and RAND2; save the first session key in the memory of the device; generate a first Message Authentication Code (MAC1) using a MAC generation function with RAND2 and K_com as the input; and transmit MAC1 to the element of the first provider network.

In accordance with an embodiment of the disclosure, the instructions further comprises, in response to the Auth. Type being the first or second type of authentication, instructions to: receive a second Authentication Response Message from the element of the second provider network, wherein the first Authentication Response Message includes an identity of the second provider network (SP_ID), RAND1, a second encrypted message m2 generated by the element of the second provider network containing a third random number (RAND3) using the Device_ID based on Identity Based Encryption (IBE), and a signature (Sig_SP) using the secret key of the second provider network and the GPK; authenticate the second provider network by verifying Sig_SP using SP_ID and the GPK; in response to authentication being successful, decrypt m2 with the secret key of the device to obtain RAND3; derive the second session key (K_ser) using the pre-defined KDF with input parameters being RAND1 and RAND3; save the second session key in the memory of the device; generate a second Message Authentication Code (MAC1) using a MAC generation function with RAND3 and K_ser as the input; and transmit MAC2 to the element of the second provider network.

In accordance with an embodiment of the disclosure, the instructions further comprises, in response to the Auth. Type being the third type of authentication, instructions to: receive an Authentication Response Message from the element of the second provider network, wherein the Authentication Response Message includes an identity of the second provider network (SP_ID), RAND1, an encrypted message m generated by the element of the second provider network containing a second random number (RAND2) using the Device_ID based on Identity Based Encryption (IBE), and a signature (Sig_SP) using the secret key of the second provider network and the GPK; authenticate the second provider network by verifying Sig_SP using SP_ID and the GPK; in response to authentication being successful, decrypt m2 with the secret key of the device to obtain RAND2; derive the second session key (K_ser) using the pre-defined KDF with input parameters being RAND1 and RAND2; save the second session key in the memory of the device; generate a Message Authentication Code (MAC) using a MAC generation function with RAND2 and K_ser as the input; and transmit MAC to the element of the second provider network.

In accordance with another aspect of the disclosure, an operator provider network for an authentication framework involving a device, a service provider network and the operator provider network based on an Identity-Based Cryptography where each of the device, operator provider network and service provider network has a different private key and a same Global Public Key (GPK) issued by a public key generator, the operator provider network comprising: an authentication node comprising a processor, a memory and instructions stored on the memory and executable by the processor to: receive an authentication data package from the device, the authentication data package comprises a first random number (RAND1), an Authentication Type (Auth. Type), Service Provider network's ID (SP_ID), an identity of the device (Device_ID) and a device's signature (Sig_De), wherein the Auth. Type comprises a first type where authentication involves the operator and service provider networks, a second type where authentication involves the operator provider network, and a third type where authentication involves the service provider network; determine a type of authentication based on the Authentication Type; in response to determining the first type of authentication, generate and transmit a first Authentication Response Message to the device and transmit the authentication data package to an element of the second provider network based on the SP_ID; in response to determining the second type of authentication, generate and transmit the first Authentication Response Message to the device; and in response to determining the third type of authentication, transmit the authentication data package to the element of the second provider network. The Sig_De is generated by the device using the secret key of the device and the Global Public Key (GPK). The authentication data package further includes a first random number (RAND1), an identity of the device (Device_ID) and a device's signature (Sig_De).

In accordance with an embodiment of the disclosure, the instruction, stored on the memory of the authentication node, to generate and transmit the first Authentication Response Message to the device comprises instructions to: verify the Sig_De using the Device_ID and the GPK; and in response to verification being successful, generate a second random number (RAND2).

In accordance with an embodiment of the disclosure, the instruction, stored on the memory of the authentication node, to generate and transmit the first Authentication Response Message to the device further comprises instructions to: generate a first encrypted message (m1) containing RAND2 using the Device_ID based on Identity Based Encryption (IBE); generate a signature (Sig_AN) using the secret key of the operator provider network and the GPK; and generating and transmitting the first Authentication Response Message to the device, wherein the first Authentication Response Message includes an identity of the operator provider network (AN_ID), RAND1, m1, and Sig_AN.

In accordance with an embodiment of the disclosure, the instruction, stored on the memory of the authentication node, to generate and transmit the first Authentication Response Message to the device further comprises instructions to: receive a first Message Authentication Code (MAC1) generated by the device by using a MAC generation function with RAND2 and a first session key (K_com) as the input; derive the first session key (K_com) using a pre-defined Key Derivation Function (KDF) with input parameters being RAND1 and RAND2; generate a MAC using a MAC generation function with RAND2 and K_com as the input; determine whether MAC1 is equal to MAC; and in response to MAC1 being equal to MAC, save the first session key, K_com, in the memory of the authentication node.

In accordance with another aspect of the disclosure, a service provider network for an authentication framework involving a device, an operator provider network and the service provider network based on an Identity-Based Cryptography where each of the device, operator provider network and service provider network has a different private key and a same Global Public Key (GPK) issued by a public key generator, the service provider network comprising: an authentication unit comprising a processor, a memory and instructions stored on the memory and executable by the processor to: receive an authentication data package from the operator provider network, the authentication data package comprises a first random number (RAND1), an Authentication Type (Auth. Type), Service Provider network's ID (SP_ID), an identity of the device (Device_ID) and a device's signature (Sig_De), wherein the Auth. Type comprises a first type where authentication involves the operator and service provider networks, a second type where authentication involves the operator provider network, and a third type where authentication involves the service provider network; verify the Sig_De using the Device_ID and the GPK; and in response to verification being successful, generate a third random number (RAND3).

In accordance with an embodiment of the disclosure, the instruction further comprises instructions to: generate a second encrypted message (m2) containing RAND3 using the Device_ID based on IBE; generate a signature (Sig_SP) using the secret key of the service provider network and the GPK; and generate and transmit a second Authentication Response Message to the device, wherein the second Authentication Response Message includes an identity of the service provider network (SP_ID), RAND1, m2, and Sig_SP.

In accordance with an embodiment of the disclosure, the instruction further comprises instructions to: receive a second Message Authentication Code (MAC2) generated by the device by using a MAC generation function with RAND3 and a second session key (K_ser) as the input; derive the second session key (K_ser) using a pre-defined KDF with input parameters being RAND1 and RAND3; generate a MAC using the MAC generation function with RAND3 and K_ser as the input; determine whether MAC2 is equal to MAC; and in response to MAC2 being equal to MAC, save the second session key, K_ser, in the memory of the authentication unit.

In accordance with another aspect of the disclosure, a unified authentication method for a device to authenticate a first provider network and a second provider network based on Identity-Based Cryptography where each of the device, first provider network and second provider network has a different private key and a same Global Public Key (GPK) issued by a public key generator, the unified authentication method comprising: the device, generating a random number (RAND1) and deriving a first symmetric key (K_C) and a second symmetric key (K_S) the device, generating and transmitting an authentication data package to the operator provider network, the authentication data package includes RAND1, an Authentication Type (Auth. Type), the second provider network's ID (SP_ID), an identity of the device (Device_ID) and a device's signature (Sig_De), wherein the Auth. Type comprises a first type where authentication involves an element of the first provider network and an element of the second provider network, a second type where authentication involves the element of the first provider network, and a third type where authentication involves the element of the second provider network; the element of the first provider network, in response to receiving the authentication data package, determining a type of authentication based on the Authentication Type; the element of the first provider network, in response to determining the first type of authentication, generating and transmitting a first Authentication Response Message to the device and transmitting the authentication data package to the element of the second provider network based on the SP_ID; and the element of the second provider network, in response to receiving the authentication data package, generating and transmitting a second Authentication Response Message to the device. The Sig_De is generated by the device using the secret key of the device and the Global Public Key (GPK).

In accordance with an embodiment of the disclosure, the first symmetric key (K_C) is derived with the private key of the device (xH(Device_ID)) and an identity of the element of the first provider network (BS_ID) and the second symmetric key (K_S) is derived with the xH(Device_ID) and the identity of the element of the second provider network (SP_ID).

In accordance with an embodiment of the disclosure, the step of generating and transmitting, by the element of the first provider network, the first Authentication Response Message to the device comprises: verifying the Sig_De using the Device_ID and the GPK; and in response to verification being successful, generating a second random number (RAND2).

In accordance with an embodiment of the disclosure, the step of generating and transmitting, by the element of the first provider network, the first Authentication Response Message to the device further comprises: deriving the first symmetric key (K_C) with the private key of the first provider network (xH(BS_ID)) and the Device_ID; generating a first encrypted message (m1) containing RAND2 using the K_C and can be expressed in the following manner: m1=En(RAND2, K_C); generating a signature (Sig_AN) using the secret key of the first provider network and the GPK; and generating and transmitting the first Authentication Response Message to the device, wherein the first Authentication Response Message includes an identity of the first provider network (AN_ID), RAND1, m1, and Sig_AN.

In accordance with an embodiment of the disclosure, the method further comprising: the device, in response to receiving the first Authentication Response Message, performing the following steps: authenticating the first provider network by verifying Sig_AN using AN_ID and the GPK; in response to authentication being successful, decrypting m1 with the first symmetric key, K_C to obtain RAND2; deriving a first session key (K_com) using a pre-defined KDF with input parameters being RAND1 and RAND2; saving the first session key in the memory of the device; generating a first Message Authentication Code (MAC1) using a MAC generation function with RAND2 and K_com as the input; and transmitting MAC1 to the element of the first provider network.

In accordance with an embodiment of the disclosure, the method further comprising the element of the first provider network, in response to receiving the MAC1, performing the following steps: deriving the first session key (K_com) using the pre-defined Key Derivation Function (KDF) with input parameters being RAND1 and RAND2; generating a MAC using the same MAC generation function with RAND2 and K_com as the input; determining whether MAC1 is equal to MAC; and in response to MAC1 being equal to MAC, saving the first session key, K_com, in a memory of the element of the first provider network.

In accordance with an embodiment of the disclosure, the step of generating and transmitting, by the element of the second provider network, the second Authentication Response Message to the device comprises: verifying the Sig_De using the Device_ID and the GPK; and in response to verification being successful, generating a third random number (RAND3).

In accordance with an embodiment of the disclosure, the step of generating and transmitting, by the element of the second provider network, the second Authentication Response Message to the device further comprises: deriving the second symmetric key (K_S) with the private key of the second provider network (xH(SP_ID)) and the Device_ID; generating a second encrypted message (m2) containing RAND3 using the K_S; generating a signature (Sig_SP) using the secret key of the second provider network and the GPK; and generating and transmitting the second Authentication Response Message to the device, wherein the second Authentication Response Message includes an identity of the second provider network (SP_ID), RAND1, m2, and Sig_SP.

In accordance with an embodiment of the disclosure, the method further comprising the device, in response to receiving the second Authentication Response Message, performing the following steps: authenticating the second provider network by verifying Sig_SP using SP_ID and the GPK; in response to authentication being successful, decrypting m2 with the second symmetric key, K_S, to obtain RAND3; deriving the second session key (K_ser) using the pre-defined KDF with input parameters being RAND1 and RAND3; saving the second session key in the memory of the device; generating a second Message Authentication Code (MAC1) using a MAC generation function with RAND3 and K_ser as the input; and transmitting MAC2 to the element of the second provider network.

In accordance with an embodiment of the disclosure, the method further comprising the element of the second provider network, in response to receiving the MAC2, performing the following steps: deriving a second session key (K_ser) using the pre-defined KDF with input parameters being RAND1 and RAND3; generating a MAC using the same MAC generation function with RAND3 and K_ser as the input; determining whether MAC2 is equal to MAC; and in response to MAC2 being equal to MAC, saving the second session key, K_ser, in a memory of the element of the second provider network.

In accordance with another aspect of the disclosure, a unified authentication method for a device to authenticate a first provider network and a second provider network based on Identity-Based Cryptography where each of the device, first provider network and second provider network has a different private key and a same Global Public Key (GPK) issued by a public key generator is provided. The unified authentication method comprising: the device, generating a random number (RAND1) and deriving a DH public key (A), the DH public key (A) is derived by A=gRAND1 mod p, where mod denotes the modulo operation; the device, generating and transmitting an authentication data package to the operator provider network, the authentication data package includes the DH public key (A), an Authentication Type (Auth. Type), the second provider network's ID (SP_ID), an identity of the device (Device_ID) and a device's signature (Sig_De), wherein the Auth. Type comprises a first type where authentication involves an element of the first provider network and an element of the second provider network, a second type where authentication involves the element of the first provider network, and a third type where authentication involves the element of the second provider network; the element of the first provider network, in response to receiving the authentication data package, determining a type of authentication based on the Authentication Type; the element of the first provider network, in response to determining the first type of authentication, generating and transmitting a first Authentication Response Message to the device and transmitting the authentication data package to the element of the second provider network based on the SP_ID; and the element of the second provider network, in response to receiving the authentication data package, generating and transmitting a second Authentication Response Message to the device. The Sig_De is generated by the device using the secret key of the device and the Global Public Key (GPK).

In accordance with an embodiment of the disclosure, the step of generating and transmitting, by the element of the first provider network, the first Authentication Response Message to the device comprises: verifying the Sig_De using the Device_ID and the GPK; and in response to verification being successful, generating a second random number (RAND2).

In accordance with an embodiment of the disclosure, the step of generating and transmitting, by the element of the first provider network, the first Authentication Response Message to the device further comprises: deriving a DH public key (B) where B=gRAND2 mod p; and deriving a first session key (K_com) where K_com=ARAND2 mod p.

In accordance with an embodiment of the disclosure, the step of generating and transmitting, by the element of the first provider network, the first Authentication Response Message to the device further comprises: generating a signature (Sig_AN) using the secret key of the first provider network and the GPK; and generating and transmitting the first Authentication Response Message to the device, wherein the first Authentication Response Message includes an identity of the first provider network (AN_ID), DH public key (A), DH public key (B), and Sig_AN.

In accordance with an embodiment of the disclosure, the method further comprising the device, in response to receiving the first Authentication Response Message, performing the following steps: authenticating the first provider network by verifying Sig_AN using AN_ID and the GPK; in response to authentication being successful, deriving the first session key, K_com using the DH public key (B) where K_com=BRAND2 mod p; saving the first session key in the memory of the device; generating a first Message Authentication Code (MAC1) using a MAC generation function with DH public key (B) and K_com as the input; and transmitting MAC1 to the element of the first provider network.

In accordance with an embodiment of the disclosure, the method further comprising the element of the first provider network, in response to receiving the MAC1, performing the following steps: generating a MAC using the same MAC generation function with DH public key (B) and K_com as the input; determining whether MAC1 is equal to MAC; in response to MAC1 being equal to MAC, saving the first session key, K_com, in a memory of the element of the first provider network.

In accordance with an embodiment of the disclosure, the step of generating and transmitting, by the element of the second provider network, the second Authentication Response Message to the device comprises: verifying the Sig_De using the Device_ID and the GPK; and in response to verification being successful, generating a third random number (RAND3).

In accordance with an embodiment of the disclosure, the step of generating and transmitting, by the element of the second provider network, the second Authentication Response Message to the device further comprises: deriving a DH public key (C) where C=gRAND3 mod p; and deriving a second session key (K_ser) where K_ser=ARAND3 mod p.

In accordance with an embodiment of the disclosure, the step of generating and transmitting, by the element of the second provider network, the second Authentication Response Message to the device further comprises: generating a signature (Sig_SP) using the secret key of the second provider network and the GPK; and generating and transmitting the second Authentication Response Message to the device, wherein the second Authentication Response Message includes an identity of the second provider network (SP_ID), DH public key (A), DH public key (C), and Sig_SP.

In accordance with an embodiment of the disclosure, the method further comprising the device, in response to receiving the second Authentication Response Message, performing the following steps: authenticating the second provider network by verifying Sig_SP using SP_ID and the GPK; in response to authentication being successful, deriving the second session key, K_ser using the DH public key (C) where K_ser=CRAND3 mod p; saving the second session key in the memory of the device; generating a second Message Authentication Code (MAC2) using a MAC generation function with DH public key (C) and K_ser as the input; and transmitting MAC2 to the element of the second provider network.

In accordance with an embodiment of the disclosure, the method further comprising the element of the second provider network, in response to receiving the MAC2, performing the following steps: generating a MAC using the same MAC generation function with DH public key (C) and K_ser as the input; determining whether MAC2 is equal to MAC; and in response to MAC2 being equal to MAC, saving the second session key, K_ser, in a memory of the element of the second provider network.

BRIEF DESCRIPTION OF THE DRAWINGS

The above advantages and features in accordance with this disclosure are described in the following detailed description and are shown in the following drawings.

DETAILED DESCRIPTION

Figure 1:
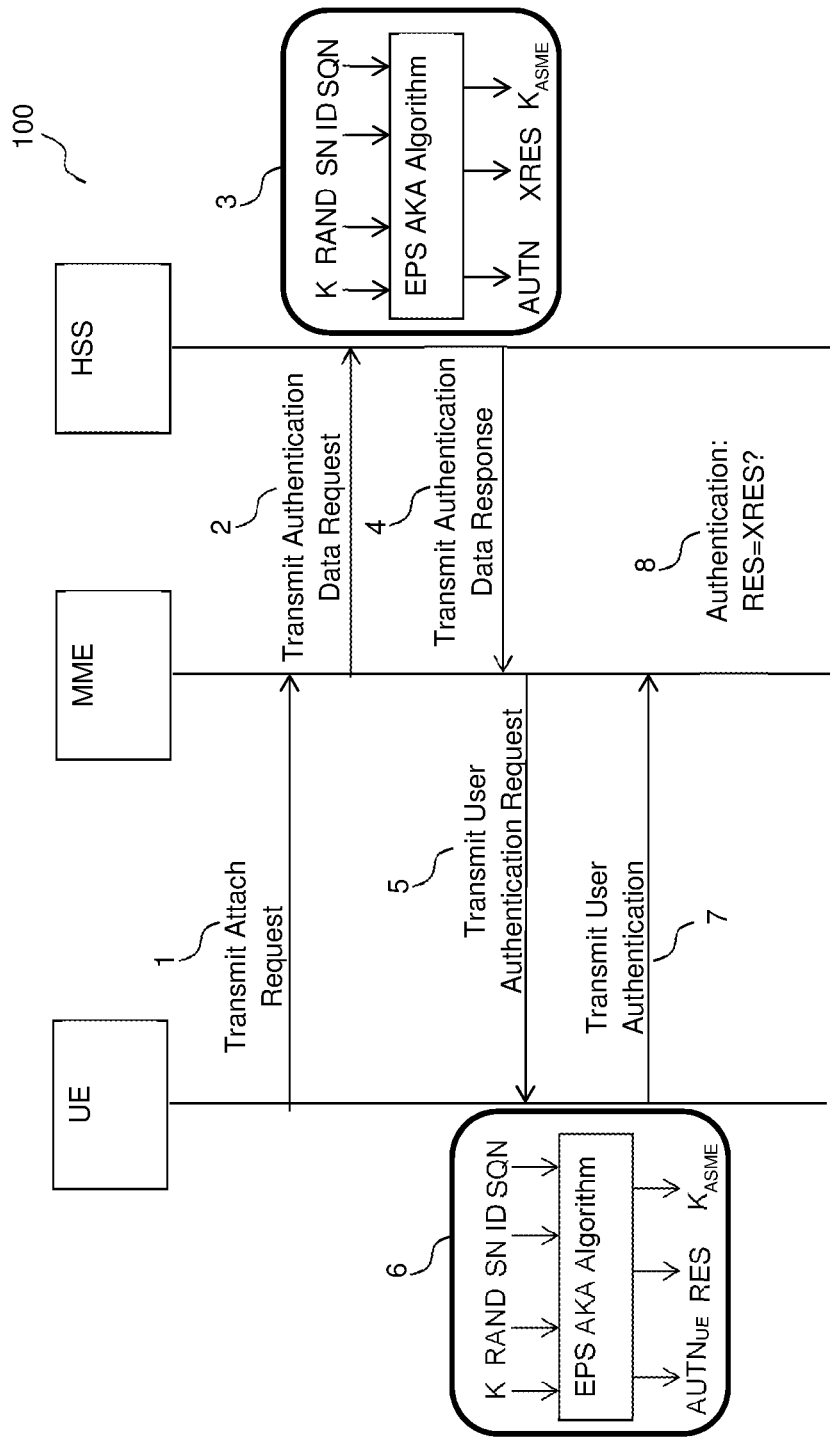
FIG. 1 illustrating an AKA procedure.

This disclosure relates to a method and system of an authentication framework between an operator provider and a service provider. Particularly, this disclosure relates to a method and system of a unified authentication framework between an operator provider and a service provider based on ID-Based cryptography.

There are essentially three problems that can be solved with the system and method in accordance with this disclosure. First, the current operator provider network access authentication is separate from the service provider network authentication. Thus, the end-devices have to go through two authentication procedures to get access to both the operator provider network and service provider network.

Secondly, the current service provider network authentication is usually based on "user name+password". In other words, users need to remember multiple sets of "user name+password" in order to get access to multiple services. This is inconvenient and cumbersome. By using the unified authentication as proposed, the service provider network authentication can be done together with the operator provider network authentication and through the operator provider network authentication method. This means that the users do not need to remember any passwords and this brings great convenience to the users.

Lastly, another problem that can be overcome is to guarantee the privacy of users when the unified authentication is adopted. Particularly, the message between the user and the service provider should not be exposed to the Mobile Network Operator (MNO) and the message between the user and the MNO should not be exposed to the service provider.

In this disclosure, a unified first provider network and a second provider network authentication scheme based on ID-based cryptography is proposed. Essentially, the concept is to use one authentication message to successfully achieve both first provider network access authentication and the second provider network authentication. For purpose of this disclosure, the first network is an operator provider network and the second network is a service provider network. Further, a new parameter referred to as Authentication Type is introduced. The Authentication Type serves as an indicator to identify which types of authentication (such as operator provider network access only, service provider network access only, or a unified authentication) that the users wish to proceed. Further, we propose several different ways to protect the random number that is used to generate the session key.

Identity-based cryptography (IBC) is a type of public-key cryptography in which a public key is a known string such as an email address, phone number, domain name, or a physical IP address. For an IBC-based system, a public key generator can generate a private key (SKID) for any given ID based on a given Global Public Key (GPK) and Global Secret Key (GSK). The generated private key SKID is distributed to an entity (Alice or Bob) together with GPK and the ID.

The IBC includes identity-based encryption (IBE) and identity-based signature (IBS). IBE is mainly used for encryption while IBS is mainly used for signing messages. For example, when Alice wants to send secret messages to Bob, she encrypts the message with Bob's ID. When Bob receives the message, Bob decrypts the message with its private key. When Alice wants Bob to authenticate itself, Alice generates a random number first and further generates a signature for the random number with the SKID and GPK based on a known algorithm. Then Alice sends a message with the random number, the signature and its ID to the other entity, Bob. After receiving the message, Bob authenticates Alice with the received random number, signature ID, and the GPK based on a known algorithm. If the verification is successful, Bob subsequently authenticates with Alice. Similarly, Alice can also authenticate entity Bob with Bob's signature and ID. With the above example, we can see that the advantage of the IBC-based authentication is that it does not need a centralized server to preserve the credentials of devices in authentication.

Figure 2:
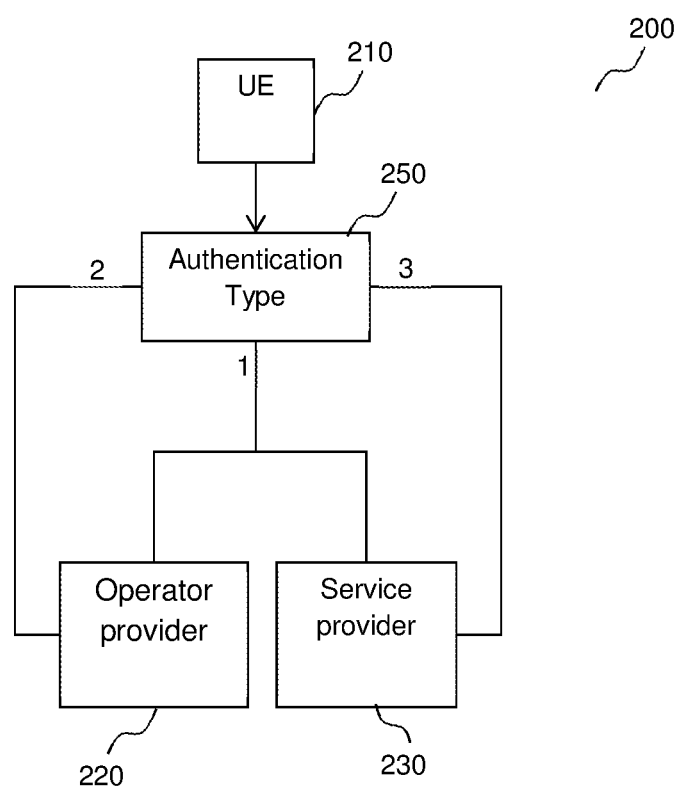
FIG. 2 illustrating a use of an Authentication Type to indicate the type of authentication to proceed with the authentication in accordance with this disclosure.

FIG. 2 illustrates the use of an Authentication Type 250 to indicate the type of authentication to proceed with the authentication. As mentioned above, this disclosure discloses a unified operator provider network and service provider network authentication scheme based on ID-based cryptography. While it is possible for a UE 210 to authenticate with both operator and service providers 220 and 230, the authentication procedure as proposed in this disclosure also allows a user to authenticate with operator and service providers separately. Hence, the Authentication Type 250 is used for identifying the type of authentication to proceed. For purpose of this disclosure, if the Authentication Type 250 is a first type 1, the UE authenticate with both operator and service providers 220 and 230. If the Authentication Type 250 is a second type 2, the UE authenticate with operator provider 220 for operator network access. If the Authentication Type 250 is a third type 3, the UE authenticate with service provider 230 for service level access.

We will first discuss the first type 1 of Authentication Type 250, followed by second type 2 and third type 3.

Figure 3:
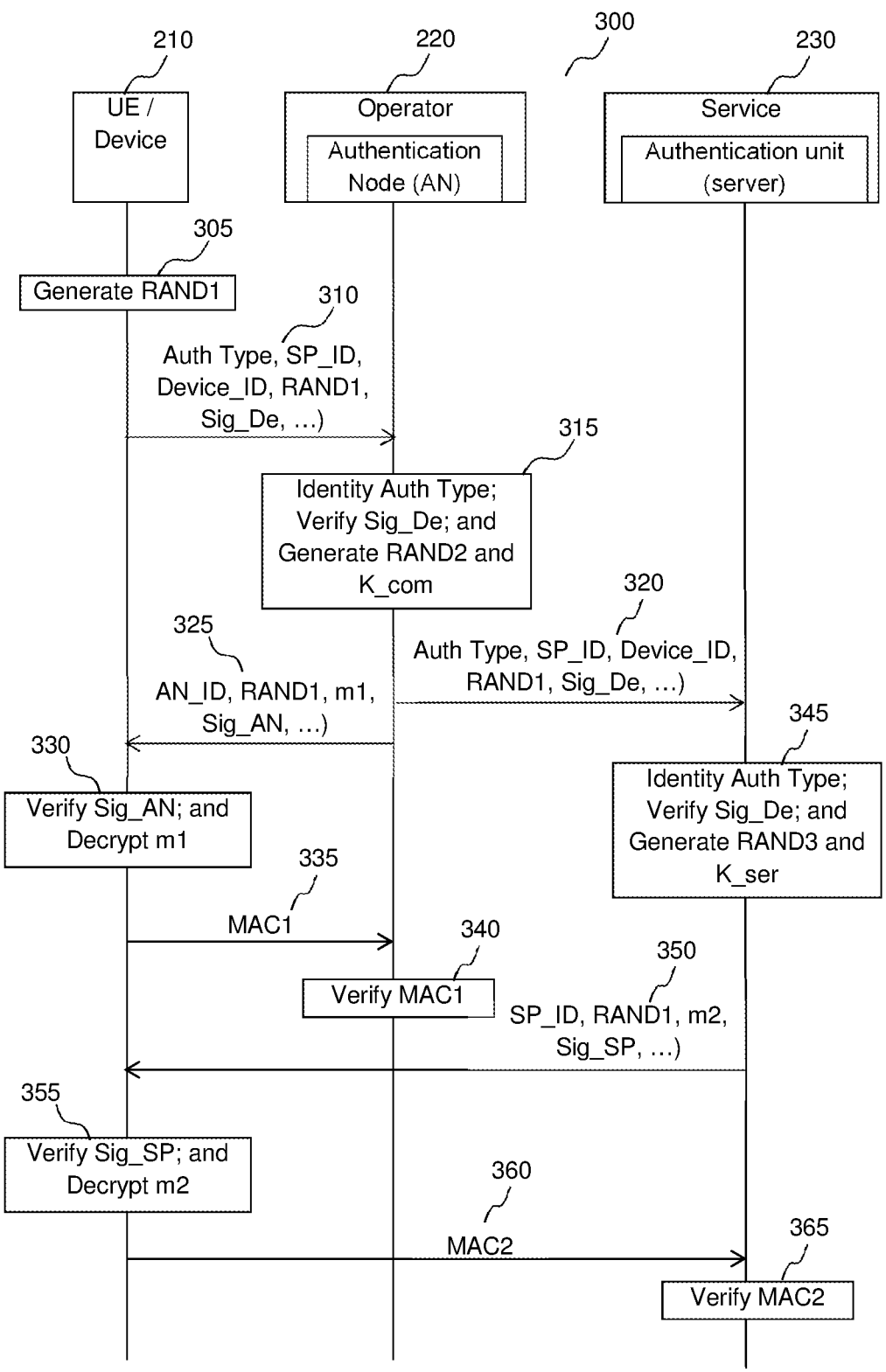
FIG. 3 illustrating a process 300 of a unified operator provider and service provider authentication procedure to encrypt a random number used for deriving key in accordance with this disclosure.

FIG. 3 illustrates a process 300 of a unified operator provider and service provider authentication procedure to encrypt a random number used for deriving key. Particularly, the IBE is used to encrypt the random number.

Process 300 begins with step 305 with the device 210 generating a random number (RAND1). The device 210 then sends an Authentication Message to an Authentication Node (AN) of the operator provider 220 in step 310. The Authentication Message includes Authentication Type (Auth. Type) 250, Service Provider network's ID (SP_ID), Device's ID (Device_ID), RAND1, and the device's signature (Sig_De). A possible message format is given as follows: (Auth. Type, SP_ID, Device_ID, RAND1, Sig_De, . . . ). The device's signature is generated by the device by IBS using a secret key (SKID) of the device and a GPK. Since the process 300 is a unified operator provider and service provider authentication procedure, the Authentication Type 250 for process 300 is the first type of authentication 1.

In step 315, in response to receiving the Authentication Message, the Authentication Node first identifies the Authentication Type. If Authentication Type is unified authentication, the authentication node verifies the signature of the device (Sig_De) using the device's ID (Device_ID) based on IBS. Particularly, the authentication node verifies the signature of the device (Sig_De) using the device's ID (Device_ID) and a GPK. If verification is successful, the AN generates a random number (RAND2). Thereafter, the AN derives a key (denoted as K_com) using a pre-defined key derivation function (KDF). The input parameters of the KDF include RAND1 and RAND2, and can be expressed in the following manner: K_com=KDF(RAND1, RAND2, . . . ).

In step 320, the AN forwards the Authentication Message to the Authentication Unit of the service provider.

In step 325, the Authentication Node generates an encrypted message m1 and sends an Authentication Response Message to the device 210. The encrypted message m1 is obtained by encrypting RAND2 using Device_ID based on IBE and can be expressed in the following manner: m1=En(RAND2, Device_ID). The Authentication Response Message includes the AN's ID (denoted by AN_ID), the random number received from the device (RAND1), the encrypted message m1, and the AN's signature (denoted by Sig_AN). The AN's signature is generated by the AN by IBS using a secret key (SKID) of the AN and a GPK.

In step 330, in response to receiving the Authentication Response Message from the AN, the device 210 authenticates the AN by verifying AN's signature (Sig_AN). Particularly, the device verifies the signature of the AN (Sig_AN) using the AN's ID (AN_ID) and a GPK. If verification is successful, it decrypts the message m1 with its private key, SKID of the device, to get RAND2. Then, it derives the key (K_com) using the pre-defined KDF. The input parameters of the KDF shall include RAND1 and RAND2, and can be expressed in the following manner: K_com=KDF(RAND1, RAND2, . . . ). The device 210 then saves the key, K_com, in its memory. RAND1 is also included in the Authentication Response Message to prevent replay attack.

In step 335, the device 210 generates a Message Authentication Code (MAC1) using a MAC generation function with RAND2 and K_com as the input. The device sends the MAC1 to the AN.

In step 340, in response to receiving MAC1 from the device 210, the AN verifies MAC1. To verify the MAC1, the AN generates a MAC using the same MAC generation function with RAND2 and K_com as the input, and see whether MAC1 is equal to MAC. If verification is successful, the AN saves the key, K_com, in its memory. One skilled in the art will recognise that the AN unit may derive the key (denoted as K-com) in this step instead of step 315. Particularly, upon receipt of MAC1, the AN derives the key (denoted as K-com) prior to verifying MAC1.

In step 345, in response to receiving the Authentication Message from the AN, the authentication unit of the service provider 230 first verifies the signature of the device (Sig_De) using the device's ID (Device_ID) based on IBS. Particularly, the authentication unit verifies the signature of the device (Sig_De) using the device's ID (Device_ID) and a GPK. If verification is successful, the authentication unit generates a random number (RAND3). Then, the authentication unit derives a key (denoted as K_ser) using a pre-defined key derivation function (KDF). The input parameters of the KDF shall include RAND1 and RAND3, and can be expressed in the following manner: K_ser=KDF(RAND1, RAND3, . . . ).

In step 350, the authentication unit generates an encrypted message m2 and sends an Authentication Response Message to the device 210. The encrypted message m2 is obtained by encrypting RAND3 using Device_ID based on IBE, and can be expressed in the following manner: m2=En(RAND3, Device_ID). The Authentication Response Message includes the authentication unit's ID (denoted by SP_ID), the random number received from the device (RAND1), the encrypted message m2, and the authentication unit's signature (denoted by Sig_SP). The authentication unit's signature is generated by the authentication unit by IBS using a secret key (SKID) of the authentication unit and a GPK.

In step 355, in response to receiving the Authentication Response Message from the service provider 230, the device 210 authenticates the authentication unit by verifying its signature (Sig_SP). Then, the device decrypts the message m2 with its private key to get RAND3. Then, the device 210 derives the key (K_ser) using the pre-defined KDF. The input parameters of the KDF shall include RAND1 and RAND3, and can be expressed in the following manner: K_ser=KDF(RAND1, RAND3, . . . ). The device then saves the key, K_ser, in its memory.

In step 360, the device generates a Message Authentication Code (MAC2) using a MAC generation function with RAND3 and K_ser as the input. The device 210 sends the MAC2 to the authentication unit of the service provider 230.

In step 365, in response to receiving MAC2, the authentication unit verifies MAC2. To verify the MAC2, the authentication unit generates a MAC using the same MAC generation function with RAND3 and K_ser as the input, and see whether MAC2 is equal to MAC. If verification is successful, the authentication unit then saves the key, K_ser, in its memory. One skilled in the art will recognise that the authentication unit may derive the key (denoted as K-ser) in this step instead of step 345. Particularly, upon receipt of MAC2, the authentication derives the key (denoted as K-ser) prior to verifying MAC2.

Process 300 ends after step 365. It is important to note that the steps illustrated in process 300 may be performed in the order shown, or in a different order. For example, the authentication data package, i.e. Authentication Message, in step 310 may be sent to service provider instead of the operator provider. Alternatively, the authentication data package, i.e. Authentication Message, in step 310 may be sent to both the service provider and operator provider. Further, two or more of the steps may be performed in parallel rather than sequentially. For example, steps 315, 325-340 may be performed in parallel with steps 345-365 without departing from the disclosure.

For purpose of this disclosure, the devices 210 are assumed to be equipped with multiple sets of public and private keys and at least one set of key is used for IBS, and at least one set of key is used for IBE. If multiple sets of public and private keys are used, an index to indicate the set of public and private keys used is also indicated in the Authentication Message sent to the operator and service providers so that the operator and service providers know the set of public and private keys to be used for the authentication.

For purpose of this disclosure, only three parties are considered namely, device, operator provider such as the MNO, and the service provider. One network element of the MNO is depicted here, namely, the authentication node. A further network element may be provided by the MNO known as a black list server. The function of the authentication node is to authenticate devices before granting their access. The black list server is used to store the compromised devices' ID. The authentication node should first make sure a device's ID is not in the black list server before authenticating the device. One network element of the service provider is also depicted here, namely the authentication unit. A further network element may be provided by the service provider known as an identity management server. The function of the authentication unit is to authenticate devices before granting their access to its service. The identity management server is used to generate and manage the identity of the devices.

Figure 4:
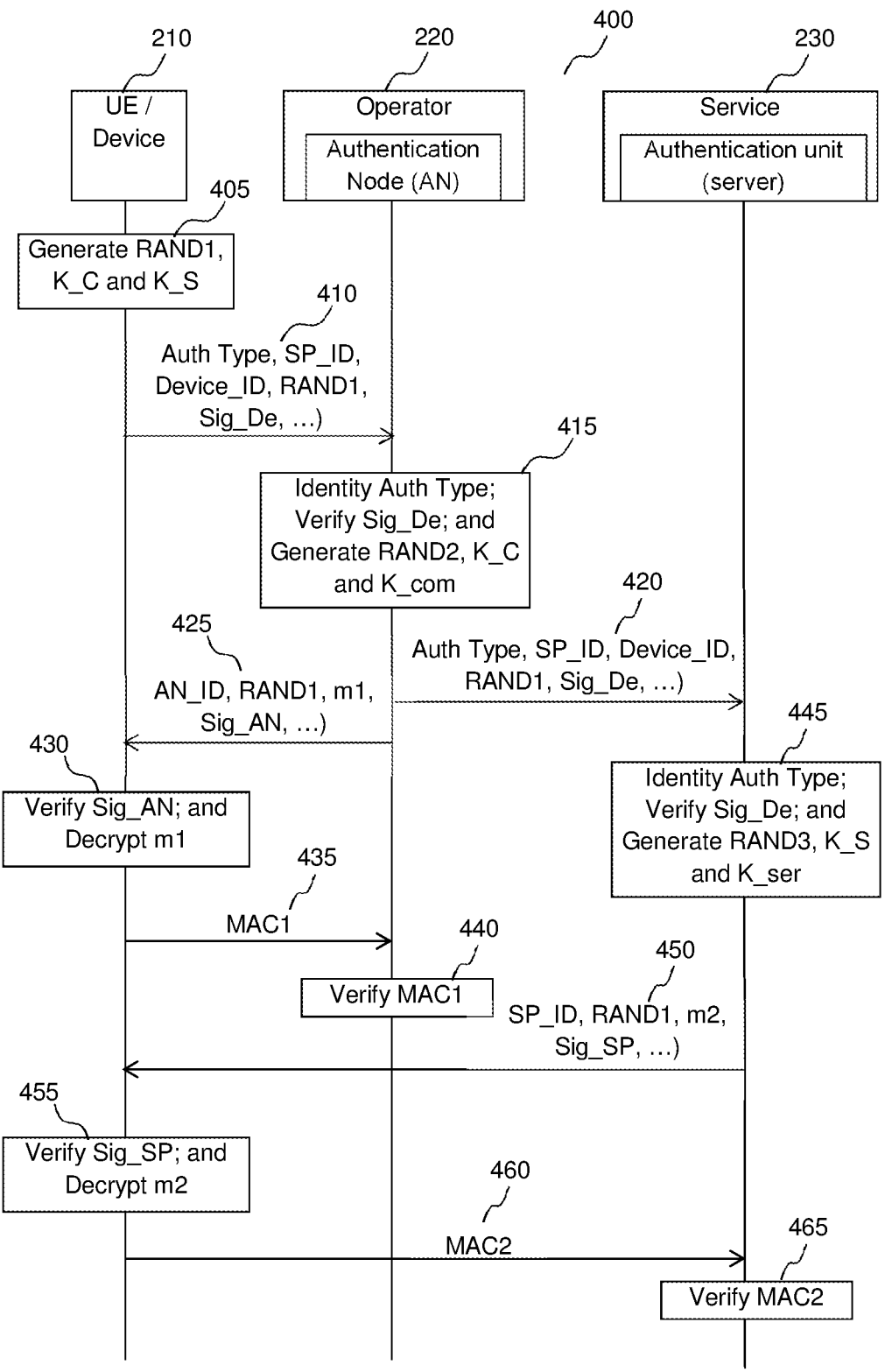
FIG. 4 illustrating alternative process 400 of a unified operator provider and service provider authentication procedure to encrypt a random number used for deriving key using symmetric key method in accordance with this disclosure.

FIG. 4 illustrates alternative process 400 of a unified operator provider and service provider authentication procedure to encrypt a random number used for deriving key using symmetric key method. Process 400 is similar to process 300 except the encryption of the random number. Particularly, a symmetric key is further used to encrypt the random number.

Process 400 begins with step 405 with the device 210 generating a random number (RAND1) and deriving a first symmetric key (K_C) and a second symmetric key (K_S). The first symmetric key (K_C) is derive with the device's private key (xH(Device_ID)) and the AN's ID (BS_ID), and can be expressed in the following manner: K_C=e(xH(Device_ID), H(BS_ID)). The second symmetric key (K_S) is derived with the device's private key (xH(Device_ID)) and the authentication unit's ID (SP_ID), and can be expressed in the following manner: K_S=e(xH(Device_ID), H(SP_ID)).

The device 210 then sends an Authentication Message to an Authentication Node (AN) of the operator provider 220 in step 410. The Authentication Message includes Authentication Type (Auth. Type) 250, Service Provider network's ID (SP_ID), Device's ID (Device_ID), RAND1, and the device's signature (Sig_De). A possible message format is given as follows: (Auth. Type, SP_ID, Device_ID, RAND1, Sig_De, . . . ). The device's signature is generated by the device by IBS using a secret key (SKID) of the device and a GPK. This is similar to step 310 of process 300.

In step 415, in response to receiving the Authentication Message, the Authentication Node first identifies the Authentication Type. If Authentication Type is unified authentication, the authentication node verifies the signature of the device (Sig_De) using the device's ID (Device_ID) based on IBS. Particularly, the authentication node verifies the signature of the device (Sig_De) using the device's ID (Device_ID) and a GPK. If verification is successful, the AN generates a random number (RAND2). Thereafter, the AN derives a key (denoted as K_com) using a pre-defined key derivation function (KDF). The input parameters of the KDF include RAND1 and RAND2, and can be expressed in the following manner: K_com=KDF(RAND1, RAND2, . . . ). Subsequently, the AN derives another symmetric key (K_C) with its private key (xH(BS_ID)) and the device's ID (Device_ID), and can be expressed in the following manner: K_C=e(xH(BS_ID), H(Device_ID)).

In step 420, the AN forwards the Authentication Message to the Authentication Unit of the service provider.

In step 425, the Authentication Node generates an encrypted message m1 and sends an Authentication Response Message to the device 210. The encrypted message m1 is obtained by encrypting RAND2 using K_C and can be expressed in the following manner: m1=En(RAND2, K_C). The Authentication Response Message includes the AN's ID (denoted by AN_ID), the random number received from the device (RAND1), the encrypted message m1, and the AN's signature (denoted by Sig_AN). The AN's signature is generated by the AN by IBS using a secret key (SKID) of the AN and a GPK.

In step 430, in response to receiving the Authentication Response Message from the AN, the device 210 authenticates the AN by verifying AN's signature (Sig_AN). Particularly, the device verifies the signature of the AN (Sig_AN) using the AN's ID (AN_ID) and a GPK. If verification is successful, it decrypts the message m1 with K_C to get RAND2. Then, it derives the key (K_com) using the pre-defined KDF. The input parameters of the KDF shall include RAND1 and RAND2, and can be expressed in the following manner: K_com=KDF(RAND1, RAND2, . . . ). The device saves the key, K_com, in its memory. In step 435, the device 210 generates a Message Authentication Code (MAC1) using a MAC generation function with RAND2 and K_com as the input. The device sends the MAC1 to the AN.

In step 440, in response to receiving MAC1 from the device 210, the AN verifies MAC1. To verify the MAC1, the AN generates a MAC using the same MAC generation function with RAND2 and K_com as the input, and see whether MAC1 is equal to MAC. If verification is successful, the AN saves the key, K_com, in its memory.

In step 445, in response to receiving the Authentication Message from the AN, the authentication unit of the service provider 230 first verifies the signature of the device (Sig_De) using the device's ID (Device_ID) based on IBS. Particularly, the authentication unit verifies the signature of the device (Sig_De) using the device's ID (Device_ID) and a GPK. If verification is successful, the authentication unit generates a random number (RAND3). Then, the authentication unit derives a key (denoted as K_ser) using a pre-defined key derivation function (KDF). The input parameters of the KDF shall include RAND1 and RAND3, and can be expressed in the following manner: K_ser=KDF(RAND1, RAND3, . . . ). Subsequently, the AN derives another symmetric key (K_S) with its private key (xH(SP_ID)) and the device's ID (Device_ID), and can be expressed in the following manner: K_S=e(xH(SP_ID), H(Device_ID)).

In step 450, the authentication unit generates an encrypted message m2 and sends an Authentication Response Message to the device 210. The encrypted message m2 is obtained by encrypting RAND3 using K_S and can be expressed in the following manner: m2=En(RAND3, K_S). The Authentication Response Message includes the authentication unit's ID (denoted by SP_ID), the random number received from the device (RAND1), the encrypted message m2, and the authentication unit's signature (denoted by Sig_SP). The authentication unit's signature is generated by the authentication unit by IBS using a secret key (SKID) of the authentication unit and a GPK.

In step 455, in response to receiving the Authentication Response Message from the service provider 230, the device 210 authenticates the authentication unit by verifying its signature (Sig_SP). Then, the device decrypts the message m2 with K_S key to get RAND3. Then, the device 210 derives the key (K_ser) using the pre-defined KDF. The input parameters of the KDF shall include RAND1 and RAND3, and can be expressed in the following manner: K_ser=KDF(RAND1, RAND3, . . . ). The device 210 then saves the key, K_ser, in its memory.

In step 460, the device generates a Message Authentication Code (MAC2) using a MAC generation function with RAND3 and K_ser as the input. The device 210 sends the MAC2 to the authentication unit of the service provider 230.

In step 465, in response to receiving MAC2, the authentication unit verifies MAC2. To verify the MAC2, the authentication unit generates a MAC using the same MAC generation function with RAND3 and K_ser as the input, and see whether MAC2 is equal to MAC. If verification is successful, the authentication unit then saves the key, K_ser, in its memory.

Process 400 ends after step 465. In process 400, the use of symmetric keys K_C and K_S is based on an important feature of the IBS scheme, which is: for ID1_SK=xH(ID1) and ID2_SK=xH(ID2); a symmetric key K=e(xH(ID1),H(ID2)) is equal to K=e(H(ID1),xH(ID2)).

Figure 5:
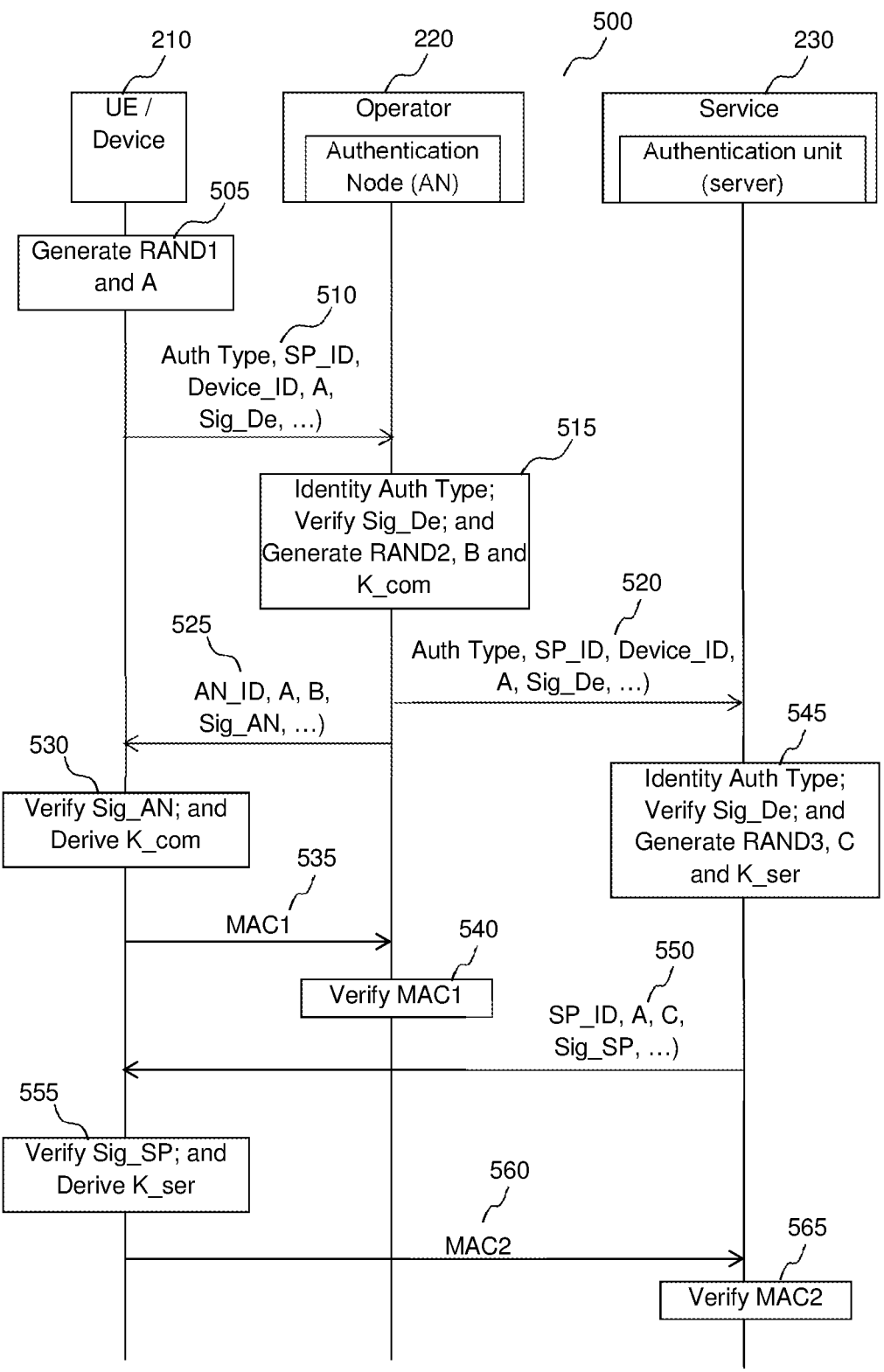
FIG. 5 illustrating an alternative process 500 of a unified operator provider and service provider authentication procedure to encrypt a random number used for deriving key using Diffie-Hellman in accordance with an embodiment of this disclosure.

FIG. 5 illustrates an alternative process 500 of a unified operator provider and service provider authentication procedure to encrypt a random number used for deriving key using Diffie-Hellman. Process 500 is similar to process 300 except the encryption of the random number. Particularly, Diffie-Hellman is used to encrypt the random number.

Process 500 begins with step 505 with the device 210 generating a random number (RAND1) and deriving a DH public key (A). The DH public key (A) is derived by A=gRAND1 mod p, where mod denotes the modulo operation.

The device 210 then sends an Authentication Message to an Authentication Node (AN) of the operator provider 220 in step 510. The Authentication Message includes Authentication Type (Auth. Type) 250, Service Provider network's ID (SP_ID), Device's ID (Device_ID), device's DH public key (A), and the device's signature (Sig_De). A possible message format is given as follows: (Auth. Type, SP_ID, Device_ID, A, Sig_De, . . . ). The device's signature is generated by the device by IBS using a secret key (SKID) of the device and a GPK.

In step 515, in response to receiving the Authentication Message, the Authentication Node first identifies the Authentication Type. If Authentication Type is unified authentication, the authentication node verifies the signature of the device (Sig_De) using the device's ID (Device_ID) based on IBS. Particularly, the authentication node verifies the signature of the device (Sig_De) using the device's ID (Device_ID) and a GPK. If verification is successful, the AN generates a random number (RAND2). Thereafter, the AN computes its DH public key (B) and derives a key (denoted as K_com). The DH public key (B) is computed by B=gRAND2 mod p while the key is derived by K_com=ARAND2 mod p.

In step 520, the AN forwards the Authentication Message to the Authentication Unit of the service provider.

In step 525, the Authentication Node sends an Authentication Response Message to the device 210. The Authentication Response Message includes the AN's ID (denoted by AN_ID), the device's DH public key received from the device (A), the authentication node's DH public key (B), and the AN's signature (denoted by Sig_AN). The AN's signature is generated by the AN by IBS using a secret key (SKID) of the AN and a GPK.

In step 530, in response to receiving the Authentication Response Message from the AN, the device 210 authenticates the AN by verifying AN's signature (Sig_AN). Particularly, the device verifies the signature of the AN (Sig_AN) using the AN's ID (AN_ID) and a GPK. If verification is successful, it derives the key (K_com) using the received DH public key, i.e., K_com=BRAND2 mod p. The device 210 then saves the key, K_com, in its memory.

In step 535, the device 210 generates a Message Authentication Code (MAC1) using a MAC generation function with B and K_com as the input. The device sends the MAC1 to the AN.

In step 540, in response to receiving MAC1 from the device 210, the AN verifies MAC1. To verify the MAC1, the AN generates a MAC using the same MAC generation function with B and K_com as the input, and see whether MAC1 is equal to MAC. If verification is successful, the AN saves the key, K_com, in its memory.

In step 545, in response to receiving the Authentication Message from the AN, the authentication unit of the service provider 230 first verifies the signature of the device (Sig_De) using the device's ID (Device_ID) based on IBS. Particularly, the authentication unit verifies the signature of the device (Sig_De) using the device's ID (Device_ID) and a GPK. If verification is successful, the authentication unit generates a random number (RAND3). Then, the authentication unit computes its DH public key (C) by C=gRAND3 mod p, and derives a key by K_ser=ARAND3 mod p.

In step 550, the authentication unit sends an Authentication Response Message to the device 210. The Authentication Response Message includes the authentication unit's ID (denoted by SP_ID), the device's DH public key received from the device (A), the authentication unit's DH public key (C), and the authentication unit's signature (denoted by Sig_SP). The authentication unit's signature is generated by the authentication unit by IBS using a secret key (SKID) of the authentication unit and a GPK.

In step 555, in response to receiving the Authentication Response Message from the service provider 230, the device 210 authenticates the authentication unit by verifying its signature (Sig_SP). Then, the device derives the key (K_ser) using the received DH public key, i.e., K_ser=CRAND1 mod p. The device 210 then saves the key, K_ser, in its memory In step 560, the device generates a Message Authentication Code (MAC2) using a MAC generation function with C and K_ser as the input. The device 210 sends the MAC2 to the authentication unit of the service provider 230.

In step 565, in response to receiving MAC2, the authentication unit verifies MAC2. To verify the MAC2, the authentication unit generates a MAC using the same MAC generation function with C and K_ser as the input, and see whether MAC2 is equal to MAC. If verification is successful, the authentication unit then saves the key, K_ser, in its memory.

Figure 6:
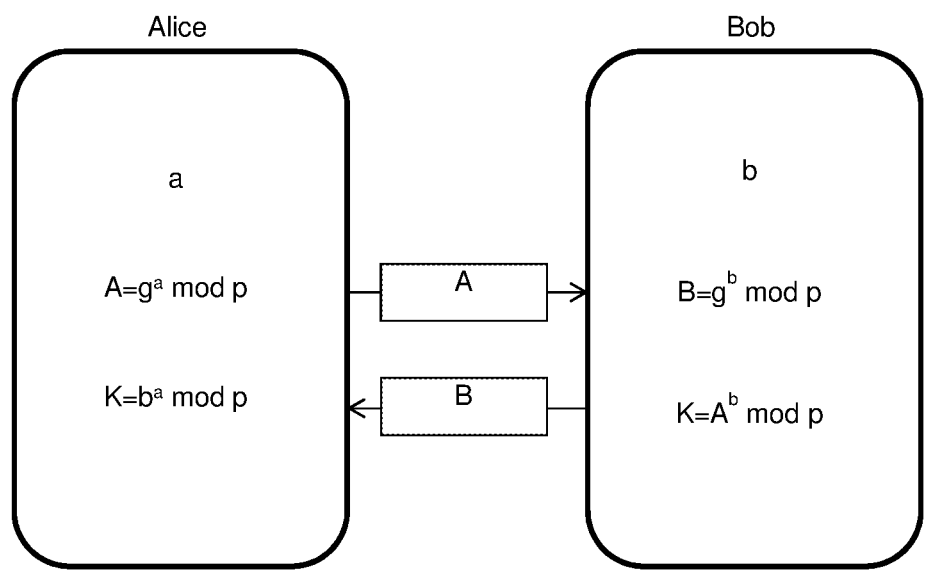
FIG. 6 illustrating a standard Diffie-Hellman key agreement procedure between two parties.

Process 500 ends after step 565. A standard Diffie-Hellman key agreement procedure between two parties, namely, Alice and Bob is illustrated in FIG. 6. First, both parties must have agreed on an arbitrary number that does not need to be kept secret. In this example, 'g' and 'p' are known while 'a' and 'b' are unknown and K=Ab mod p=(gb mod p)b=gab mod p=(gb mod p)a=Ba mod p. For Alice to exchange key with Bob, Alice first selects a random number for 'a' and determines 'A'. Alice then sends Bob 'g', 'p' and 'A'. Bob, in response to receiving the information from Alice, selects 'b' and determines 'B'. Bob then sends 'B' to Alice. For Alice, with 'B' is able to determine K since K=Ba mod p. For Bob, with 'A' is able to determine K since K=Ab mod p. K is the shared secret key and only known to both Alice and Bob.

Figure 7:
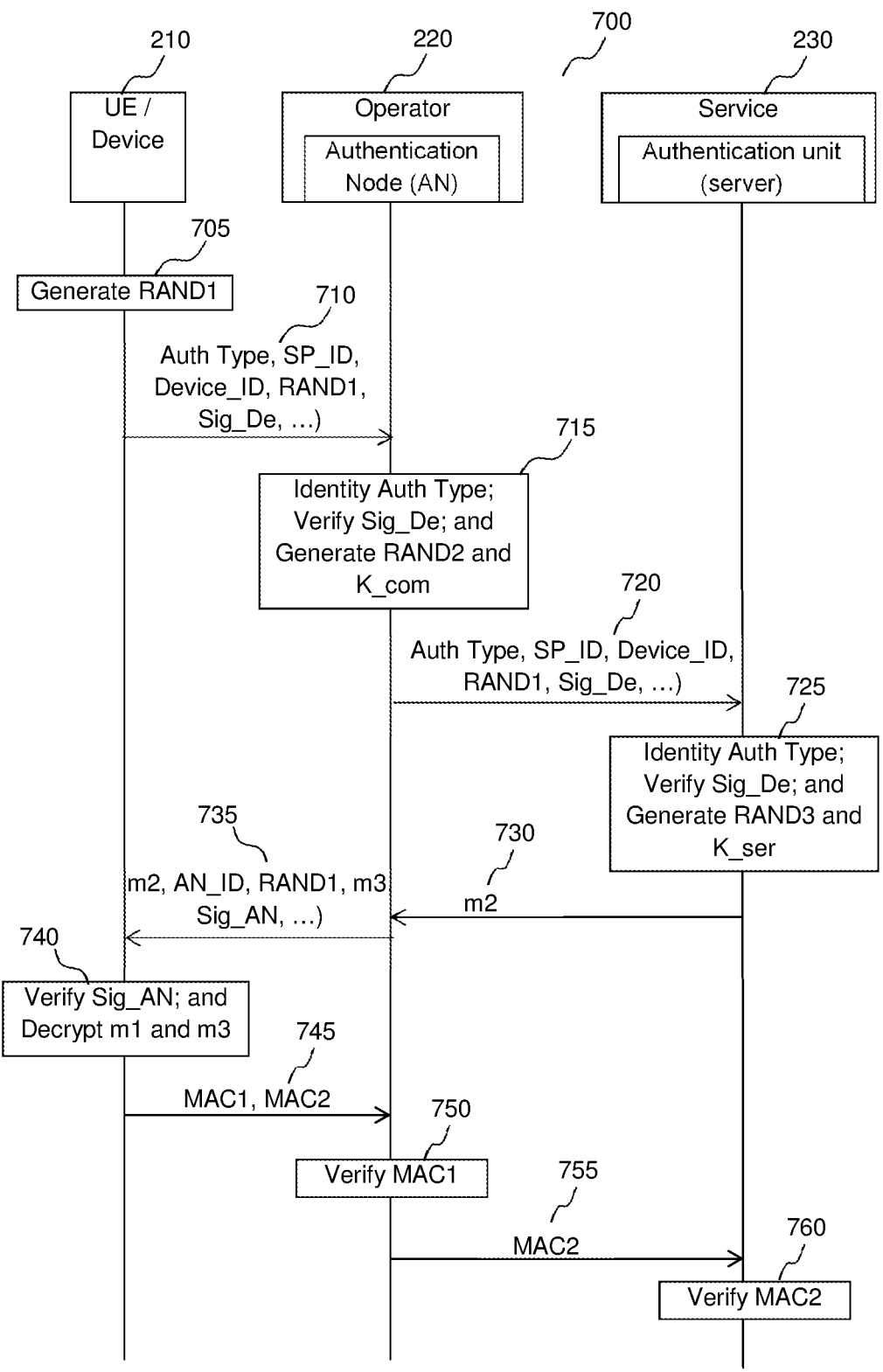
FIG. 7 illustrating an alternative process 700 of a unified operator provider and service provider authentication procedure to encrypt a random number used for deriving key in accordance with an embodiment of this disclosure.

FIG. 7 illustrates an alternative process 700 of a unified operator provider and service provider authentication procedure to encrypt a random number used for deriving key.

Particularly, process 700 illustrates the Authentication Node authenticating with the service provider on behalf of the device 210.

Process 700 begins with step 705 with the device 210 generating a random number (RAND1). The device 210 then sends an Authentication Message to an Authentication Node (AN) of the operator provider 220 in step 710. The Authentication Message includes Authentication Type (Auth. Type) 250, Service Provider network's ID (SP_ID), Device's ID (Device_ID), RAND1, and the device's signature (Sig_De). A possible message format is given as follows: (Auth. Type, SP_ID, Device_ID, RAND1, Sig_De, . . . ). The device's signature is generated by the device by IBS using a secret key (SKID) of the device and a GPK.

In step 715, in response to receiving the Authentication Message, the Authentication Node first identifies the Authentication Type. If Authentication Type is unified authentication, the authentication node verifies the signature of the device (Sig_De) using the device's ID (Device_ID) based on IBS. Particularly, the authentication node verifies the signature of the device (Sig_De) using the device's ID (Device_ID) and a GPK. If verification is successful, the AN generates a random number (RAND2). Thereafter, the AN derives a key (denoted as K_com) using a pre-defined key derivation function (KDF). The input parameters of the KDF include RAND1 and RAND2, and can be expressed in the following manner: K_com=KDF(RAND1, RAND2, . . . ).

In step 720, the AN forwards the Authentication Message to the Authentication Unit of the service provider.

In step 725, in response to receiving the Authentication Message from the AN, the authentication unit of the service provider 230 first verifies the signature of the device (Sig_De) using the device's ID (Device_ID) based on IBS. Particularly, the authentication unit verifies the signature of the device (Sig_De) using the device's ID (Device_ID) and a GPK. If verification is successful, the authentication unit generates a random number (RAND3). Then, the authentication unit derives a key (denoted as K_ser) using a pre-defined key derivation function (KDF). The input parameters of the KDF shall include RAND1 and RAND3, and can be expressed in the following manner: K_ser=KDF (RAND1, RAND3, . . . ).

In step 730, the authentication unit generates and sends an authentication response message (m2) to the AN. The Authentication Response Message (m2) includes the authentication unit's ID (denoted by SP_ID), the random number received from the device (RAND1), the encrypted message m 1, and the authentication unit's signature (denoted by Sig_SP). The authentication unit's signature is generated by the authentication unit by IBS using a secret key (SKID) of the authentication unit and a GPK. The encrypted message m1 is obtained by encrypting RAND3 using Device_ID based on IBE, and can be expressed in the following manner: m1=En(RAND3, Device_ID).

In step 735, in response to receiving m2, the Authentication Node generates an encrypted message m3 and sends an Authentication Response Message to the device 210. The encrypted message m3 is obtained by encrypting RAND2 using Device_ID based on IBE and can be expressed in the following manner: m3=En(RAND2, Device_ID). The Authentication Response Message includes the m2, AN's ID (denoted by AN_ID), the random number received from the device (RAND1), the encrypted message m3, and the AN's signature (denoted by Sig_AN). The AN's signature is generated by the AN by IBS using a secret key (SKID) of the AN and a GPK.

In step 740, in response to receiving the Authentication Response Message from the AN, the device 210 authenticates the AN by verifying AN's signature (Sig_AN). Particularly, the device verifies the signature of the AN (Sig_AN) using the AN's ID (AN_ID) and a GPK. If verification is successful, it decrypts the message m3 with its private key, SKID of the device, to get RAND2. Then, it derives the key (K_com) using the pre-defined KDF. The input parameters of the KDF shall include RAND1 and RAND2, and can be expressed in the following manner: K_com=KDF(RAND1, RAND2, . . . ). The device 210 then saves the key, K_com, in its memory. The device 210 then authenticates the authentication unit using the obtained Authentication Response Message from the service provider. The device 210 then verifies the service provider's signature (Sig_SP). Then, the device decrypts the message m1 with its private key to get RAND3. Then, the device 210 derives the key (K_ser) using the pre-defined KDF. The input parameters of the KDF shall include RAND1 and RAND3, and can be expressed in the following manner: K_ser=KDF(RAND1, RAND3, . . . ). The device 210 then saves the key, K_ser, in its memory.

In step 745, the device 210 generates a first Message Authentication Code (MAC1) using a MAC generation function with RAND2 and K_com as the input, and a second a Message Authentication Code (MAC2) using a MAC generation function with RAND3 and K_ser as the input. The device sends the MAC1 and MAC2 to the AN.

In step 750, in response to receiving MAC1 and MAC2 from the device 210, the AN verifies MAC1. To verify the MAC1, the AN generates a MAC using the same MAC generation function with RAND2 and K_com as the input, and see whether MAC1 is equal to MAC. If verification is successful, the AN saves the key, K_com, in its memory. One skilled in the art will recognise that the AN may derive the key (denoted as K-com) in this step instead of step 715. Particularly, upon receipt of MAC1, the AN derives the key (denoted as K-com) prior to verifying MAC.

In step 755, the AN forwards MAC2 to the service provider.

In step 760, in response to receiving MAC from the AN, the authentication unit verifies MAC2. To verify the MAC2, the authentication unit generates a MAC using the same MAC generation function with RAND3 and K_ser as the input, and see whether MAC2 is equal to MAC. If verification is successful, the authentication unit saves the key, K_ser, in its memory. One skilled in the art will recognise that the authentication unit may derive the key (denoted as K-ser) in this step instead of step 725. Particularly, upon receipt of MAC2, the authentication derives the key (denoted as K-ser) prior to verifying MAC2.

Process 700 ends after step 760.

Figure 8:
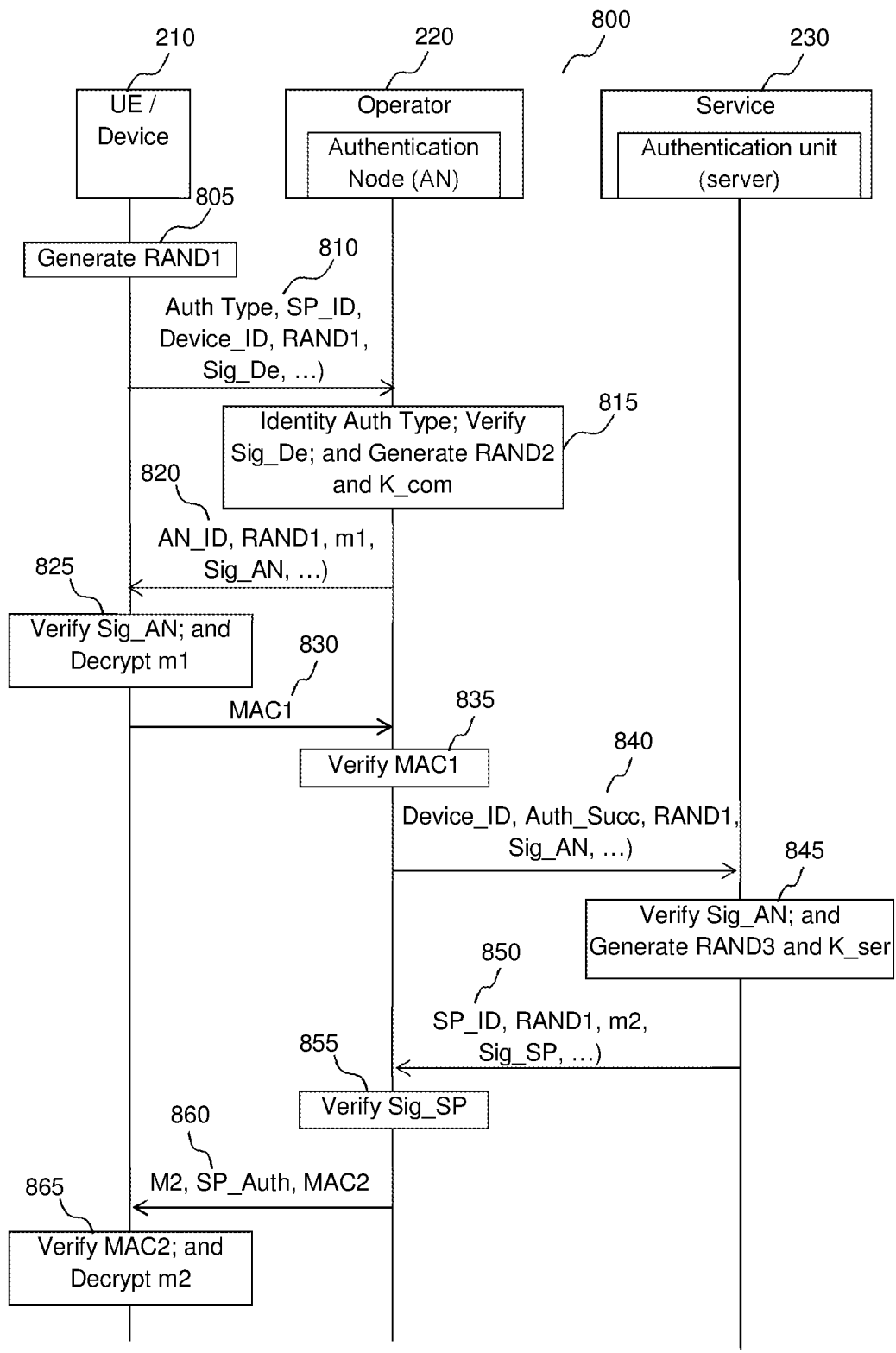
FIG. 8 illustrating an alternative process 800 of a unified operator provider and service provider authentication procedure to encrypt a random number used for deriving key in accordance with an embodiment of this disclosure.

FIG. 8 illustrates an alternative process 800 of a unified operator provider and service provider authentication procedure to encrypt a random number used for deriving key. Particularly, process 800 illustrates the sequential process of authenticating with the operator provider 220 first before authenticating with the service provider.

Process 800 begins with step 805 with the device 210 generating a random number (RAND1). The device 210 then sends an Authentication Message to an Authentication Node (AN) of the operator provider 220 in step 810. The Authentication Message includes Authentication Type (Auth. Type) 250, Service Provider network's ID (SP_ID), Device's ID (Device_ID), RAND1, and the device's signature (Sig_De). A possible message format is given as follows: (Auth. Type, SP_ID, Device_ID, RAND1, Sig_De, . . . ). The device's signature is generated by the device by IBS using a secret key (SKID) of the device and a GPK.

In step 815, in response to receiving the Authentication Message, the Authentication Node first identifies the Authentication Type. If Authentication Type is unified authentication, the authentication node verifies the signature of the device (Sig_De) using the device's ID (Device_ID) based on IBS. Particularly, the authentication node verifies the signature of the device (Sig_De) using the device's ID (Device_ID) and a GPK. If verification is successful, the AN generates a random number (RAND2). Thereafter, the AN derives a key (denoted as K_com) using a pre-defined key derivation function (KDF). The input parameters of the KDF include RAND1 and RAND2, and can be expressed in the following manner: K_com=KDF(RAND1, RAND2, . . . ).

In step 820, the Authentication Node generates an encrypted message m1 and sends an Authentication Response Message to the device 210. The encrypted message m1 is obtained by encrypting RAND2 using Device_ID based on IBE and can be expressed in the following manner: m1=En(RAND2, Device_ID). The Authentication Response Message includes the AN's ID (denoted by AN_ID), the random number received from the device (RAND1), the encrypted message m1, and the AN's signature (denoted by Sig_AN). The AN's signature is generated by the AN by IBS using a secret key (SKID) of the AN and a GPK.

In step 825, in response to receiving the Authentication Response Message from the AN, the device 210 authenticates the AN by verifying AN's signature (Sig_AN). Particularly, the device verifies the signature of the AN (Sig_AN) using the AN's ID (AN_ID) and a GPK. If verification is successful, it decrypts the message m1 with its private key, SKID of the device, to get RAND2. Then, it derives the key (K_com) using the pre-defined KDF. The input parameters of the KDF shall include RAND1 and RAND2, and can be expressed in the following manner: K_com=KDF(RAND1, RAND2, . . . ). The device 210 then saves the key, K_com, in its memory.

In step 830, the device 210 generates a Message Authentication Code (MAC1) using a MAC generation function with RAND2 and K_com as the input. The device sends the MAC1 to the AN.

In step 835, in response to receiving MAC1 from the device 210, the AN verifies MAC1. To verify the MAC1, the AN generates a MAC using the same MAC generation function with RAND2 and K_com as the input, and see whether MAC1 is equal to MAC. If verification is successful, the AN then saves the key, K_com, in its memory. One skilled in the art will recognise that the AN may derive the key (denoted as K-com) in this step instead of step 815. Particularly, upon receipt of MAC1, the AN derives the key (denoted as K-com) prior to verifying MAC1.

In step 840, the AN forwards a device Authentication Message to the Authentication Unit of the service provider. The Authentication Message includes the device's ID (Device_ID), an indicator that indicates that the device has successfully authenticated with the operator provider (Auth_Succ), the random number received from the device (RAND1), the signature of the authentication node (Sig_AN).

In step 845, in response to receiving the Authentication Message from the AN, the authentication unit of the service provider 230 first verifies the signature of the AN's signature (Sig_AN). Particularly, the authentication unit verifies the signature of the device (Sig_De) using the device's ID (Device_ID) and a GPK. If verification is successful, the authentication unit generates a random number (RAND3). Then, the authentication unit derives a key (denoted as K_ser) using a pre-defined key derivation function (KDF). The input parameters of the KDF shall include RAND1 and RAND3, and can be expressed in the following manner: K_ser=KDF(RAND1, RAND3, . . . ). The authentication unit then saves the key, K_ser, in its memory.

In step 850, the authentication unit generates an encrypted message m2 and sends an Authentication Response Message to the AN. The encrypted message m2 is obtained by encrypting RAND3 using Device_ID based on IBE, and can be expressed in the following manner: m2=En(RAND3, Device_ID). The Authentication Response Message includes the authentication unit's ID (denoted by SP_ID), the random number received from the device (RAND1), the encrypted message m2, and the authentication unit's signature (denoted by Sig_SP). The authentication unit's signature is generated by the authentication unit by IBS using a secret key (SKID) of the authentication unit and a GPK.

In step 855, in response to receiving the Authentication Response Message from the service provider 230, the AN authenticates the authentication unit by verifying its signature (Sig_SP). If authentication is successful, the AN generates a message authentication code MAC2 and sends a message to the device. The message includes the encrypted message m2, an indicator (SP_Auth) that indicates that the service provider is successfully authenticated, and MAC2. MAC2 is generated by the AN with m2, SP_Auth, K_com and can be expressed in the following manner: MAC2=MAC(m2, SP_Auth, K_com).

In step 865, in response to receiving the message from the AN, the device verifies MAC2. To verify the MAC2, the device generates a MAC using the same MAC generation function, and see whether MAC2 is equal to MAC. If verification is successful, the device decrypts the message m2 with its private key to get RAND3. Then, the device 210 derives the key (K_ser) using the pre-defined KDF. The input parameters of the KDF shall include RAND1 and RAND3, and can be expressed in the following manner: K_ser=KDF(RAND1, RAND3, . . . ). The device 210 then saves the key, K_ser, in its memory.

Process 800 ends after step 865.

Figure 9:
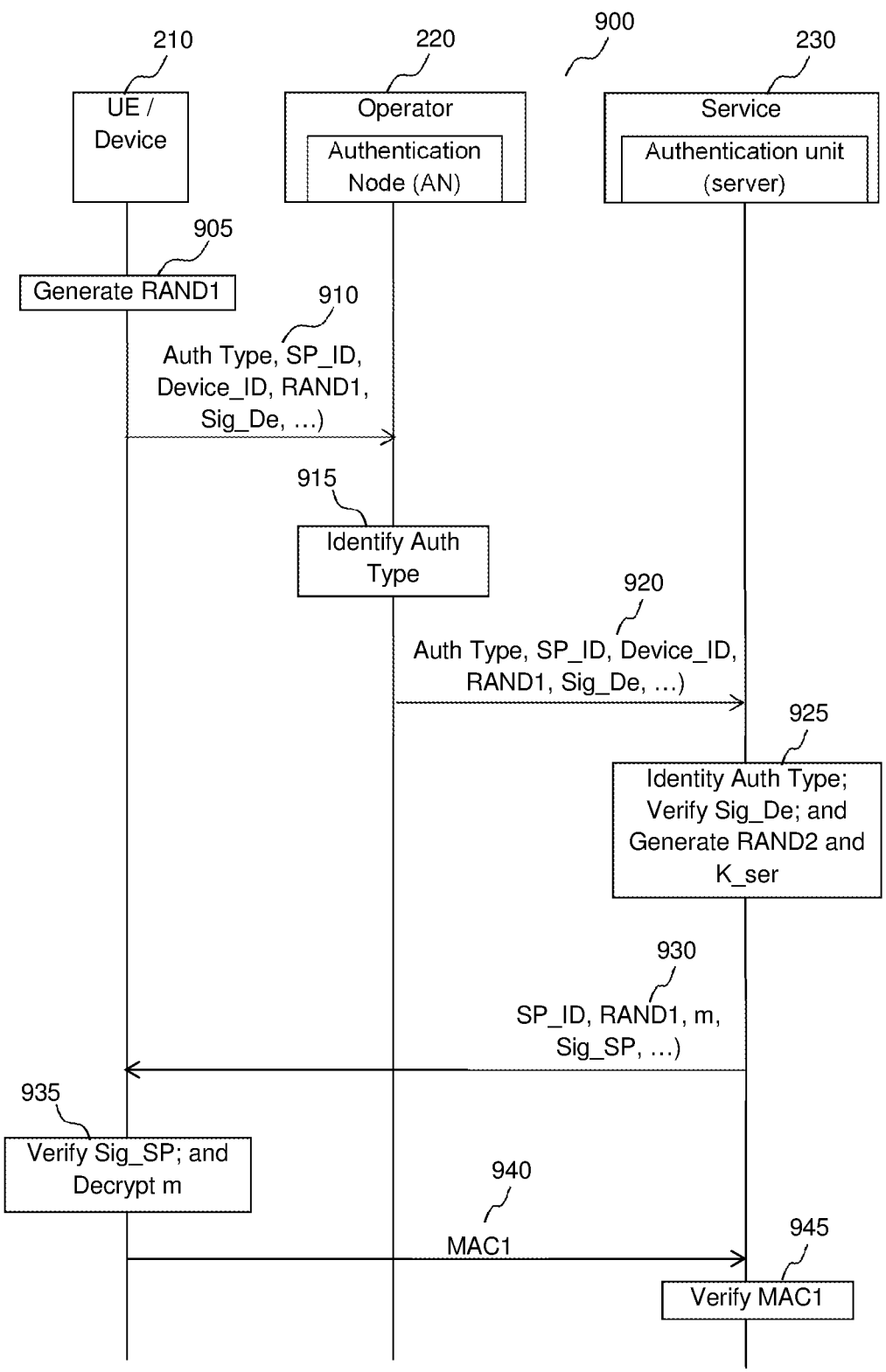
FIG. 9 illustrating a process 900 of a service provider authentication procedure to encrypt a random number used for deriving key in accordance with an embodiment of this disclosure.

FIG. 9 illustrates a process 900 of a service provider authentication procedure to encrypt a random number used for deriving key. This is applicable only when the device already has network connection with the operator provider.

Process 900 begins with step 905 with the device 210 generating a random number (RAND1). The device 210 then sends an Authentication Message to an Authentication Node (AN) of the operator provider 220 in step 910. The Authentication Message includes Authentication Type (Auth. Type) 250, Service Provider network's ID (SP_ID), Device's ID (Device_ID), RAND1, and the device's signature (Sig_De). A possible message format is given as follows: (Auth. Type, SP_ID, Device_ID, RAND1, Sig_De, . . . ). The device's signature is generated by the device by IBS using a secret key (SKID) of the device and a GPK. Since the process 900 is a service provider authentication procedure, the Authentication Type 250 for process 900 is the third type of authentication 3.

In step 915, in response to receiving the Authentication Message, the Authentication Node first identifies the Authentication Type. If Authentication Type is the third type of authentication 3, the authentication node forwards the Authentication Message to the Authentication Unit of the service provider in step 920.

In step 925, in response to receiving the Authentication Message from the AN, the authentication unit of the service provider 230 first verifies the signature of the device (Sig_De) using the device's ID (Device_ID) based on IBS. Particularly, the authentication unit verifies the signature of the device (Sig_De) using the device's ID (Device_ID) and a GPK. If verification is successful, the authentication unit generates a random number (RAND2). Then, the authentication unit derives a key (denoted as K_ser) using a predefined key derivation function (KDF). The input parameters of the KDF shall include RAND1 and RAND2, and can be expressed in the following manner: K_ser=KDF (RAND1, RAND2, . . . ).

In step 930, the authentication unit generates an encrypted message (m) and sends an Authentication Response Message to the device 210. The encrypted message m is obtained by encrypting RAND2 using Device_ID based on IBE, and can be expressed in the following manner: m=En(RAND2, Device_ID). The Authentication Response Message includes the authentication unit's ID (denoted by SP_ID), the random number received from the device (RAND1), the encrypted message m, and the authentication unit's signature (denoted by Sig_SP). The authentication unit's signature is generated by the authentication unit by IBS using a secret key (SKID) of the authentication unit and a GPK.

In step 935, in response to receiving the Authentication Response Message from the service provider 230, the device 210 authenticates the authentication unit by verifying its signature (Sig_SP). Then, the device decrypts the message m with its private key to get RAND2. Then, the device 210 derives the key (K_ser) using the pre-defined KDF. The input parameters of the KDF shall include RAND1 and RAND2, and can be expressed in the following manner: K_ser=KDF(RAND1, RAND2, . . . ). The device 210 then saves the key, K_ser, in its memory.

In step 940, the device generates a Message Authentication Code (MAC1) using a MAC generation function with RAND2 and K_ser as the input. The device 210 sends the MAC1 to the authentication unit of the service provider 230.

In step 945, in response to receiving MAC1, the authentication unit verifies MAC1. To verify the MAC1, the authentication unit generates a MAC using the same MAC generation function with RAND2 and K_ser as the input, and see whether MAC1 is equal to MAC. If verification is successful, the authentication unit then saves the key, K_ser, in its memory. One skilled in the art will recognise that the authentication unit may derive the key (denoted as K-ser) in this step instead of step 925. Particularly, upon receipt of MAC1, the authentication derives the key (denoted as K-ser) prior to verifying MAC1.

Process 900 ends after step 945.

Figure 10:
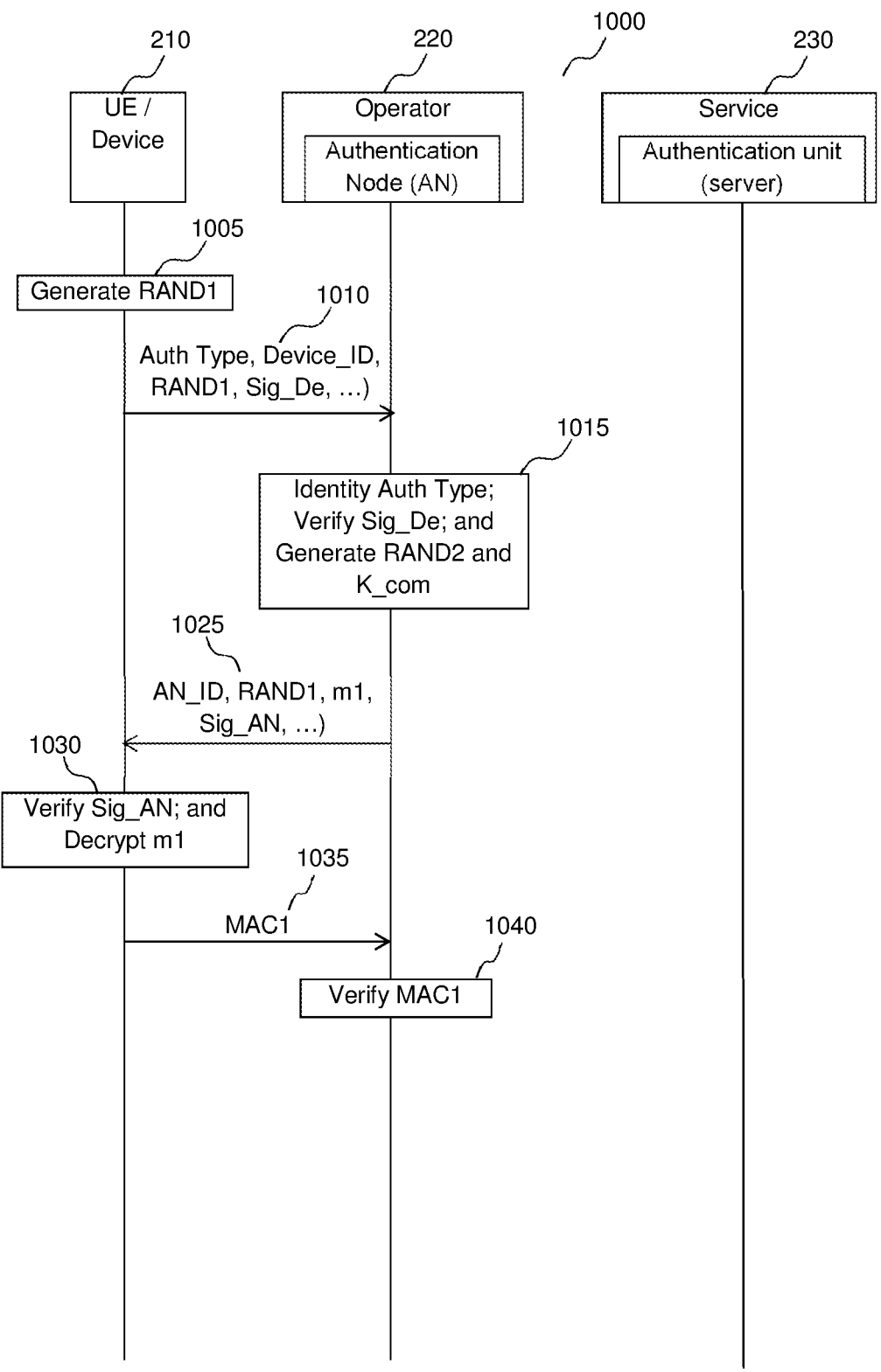
FIG. 10 illustrating a process 1000 of an operator provider authentication procedure to encrypt a random number used for deriving key in accordance with an embodiment of this disclosure.

FIG. 10 illustrates a process 1000 of an operator provider authentication procedure to encrypt a random number used for deriving key. This is applicable when the device wishes to access the network of the operator provider.

Process 1000 begins with step 1005 with the device 210 generating a random number (RAND1). The device 210 then sends an Authentication Message to an Authentication Node (AN) of the operator provider 220 in step 1010. The Authentication Message includes Authentication Type (Auth. Type) 250, Device's ID (Device_ID), RAND1, and the device's signature (Sig_De). A possible message format is given as follows: (Auth. Type, Device_ID, RAND1, Sig_De, . . . ). The device's signature is generated by the device by IBS using a secret key (SKID) of the device and a GPK. Since the process 300 is a unified operator provider and service provider authentication procedure, the Authentication Type 250 for process 300 is the second type of authentication 2.

In step 1015, in response to receiving the Authentication Message, the Authentication Node first identifies the Authentication Type. If Authentication Type is the second type of authentication, the authentication node verifies the signature of the device (Sig_De) using the device's ID (Device_ID) based on IBS. Particularly, the authentication node verifies the signature of the device (Sig_De) using the device's ID (Device_ID) and a GPK. If verification is successful, the AN generates a random number (RAND2). Thereafter, the AN derives a key (denoted as K_com) using a pre-defined key derivation function (KDF). The input parameters of the KDF include RAND1 and RAND2, and can be expressed in the following manner: K_com=KDF (RAND1, RAND2, . . . ).

In step 1025, the Authentication Node generates an encrypted message m1 and sends an Authentication Response Message to the device 210. The encrypted message m1 is obtained by encrypting RAND2 using Device_ID based on IBE and can be expressed in the following manner: m1=En(RAND2, Device_ID). The Authentication Response Message includes the AN's ID (denoted by AN_ID), the random number received from the device (RAND1), the encrypted message m1, and the AN's signature (denoted by Sig_AN). The AN's signature is generated by the AN by IBS using a secret key (SKID) of the AN and a GPK.

In step 1030, in response to receiving the Authentication Response Message from the AN, the device 210 authenticates the AN by verifying AN's signature (Sig_AN). Particularly, the device verifies the signature of the AN (Sig_AN) using the AN's ID (AN_ID) and a GPK. If verification is successful, it decrypts the message m1 with its private key, SKID of he device, to get RAND2. Then, it derives the key (K_com) using the pre-defined KDF. The input parameters of the KDF shall include RAND1 and RAND2, and can be expressed in the following manner: K_com=KDF(RAND1, RAND2, . . . ). The device 210 then saves the key, K_com, in its memory.

In step 1035, the device 210 generates a Message Authentication Code (MAC1) using a MAC generation function with RAND2 and K_com as the input. The device sends the MAC1 to the AN.

In step 1040, in response to receiving MAC1 from the device 210, the AN verifies MAC1. To verify the MAC1, the AN generates a MAC using the same MAC generation function with RAND2 and K_com as the input, and see whether MAC1 is equal to MAC. If verification is successful, the AN then saves the key, K_com, in its memory. One skilled in the art will recognise that the AN may derive the key (denoted as K-com) in this step instead of step 1015. Particularly, upon receipt of MAC1, the authentication derives the key (denoted as K-com) prior to verifying MAC.

Process 1000 ends after step 1040.

Figure 11:
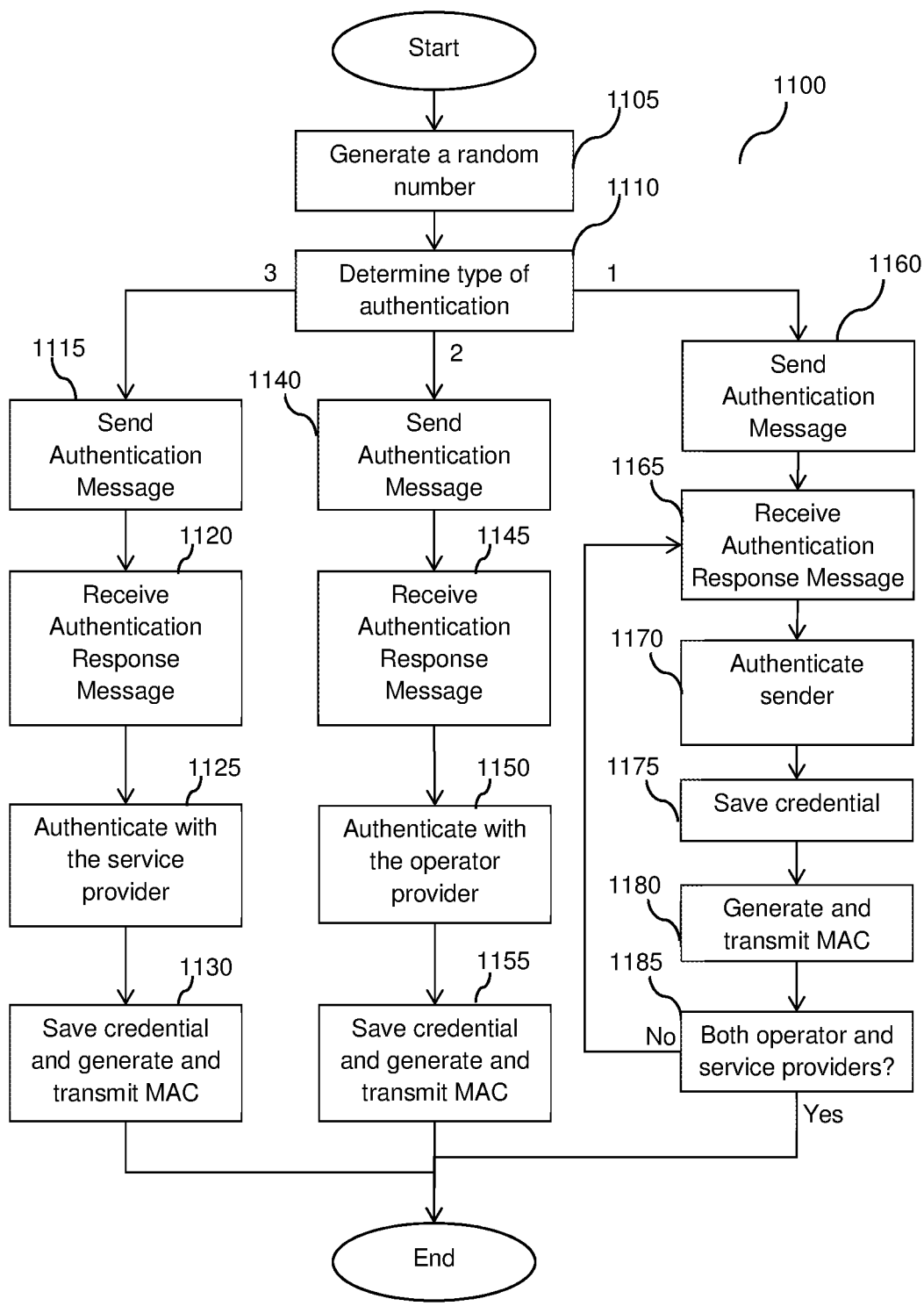
FIG. 11 illustrating a process 1100 performed by the device 110 in accordance with this disclosure.

FIG. 11 illustrates a process 1100 performed by the device 110 in accordance with this disclosure. Process 1100 proceeds with step 1105 by generating a random number (RAND1).

In another embodiment as described in process 400, step 1105 may be modified to further derive a first symmetric key (K_C) and a second symmetric key (K_S). The first symmetric key (K_C) is derived with the device's private key (xH(Device_ID)) and the AN's ID (BS_ID), and can be expressed in the following manner: K_C=e(xH(Device_ID), H(BS_ID)). The second symmetric key (K_S) is derived with the device's private key (xH(Device_ID)) and the authentication unit's ID (SP_ID), and can be expressed in the following manner: K_S=e(xH(Device_ID), H(SP_ID)).

In another embodiment as described in process 500, step 1105 may be modified to further derive a DH public key (A). The DH public key (A) is derived by A=gRAND1 mod p, where mod denotes the modulo operation.

In step 1110, process 1100 determines the type of authentication. If the authentication is for a unified authentication involving both operator provider and the service provider, process 1100 indicates 1 for the first type of authentication and proceeds to step 1160 thereafter. If the authentication is for an authentication involving only operator provider, process 1100 indicates 2 for the second type of authentication and proceeds to step 1140 thereafter. If the authentication is for an authentication involving only the service provider, process 1100 indicates 3 for the third type of authentication and proceeds to step 1115 thereafter.

In step 1115, process 1100 sends an Authentication Message to an Authentication Node (AN) of the operator provider 220. The Authentication Message includes Authentication Type (Auth. Type) 250, Service Provider network's ID (SP_ID), Device's ID (Device_ID), RAND1, and the device's signature (Sig_De). The possible message format is given as follows: (Auth. Type, SP_ID, Device_ID, RAND1, Sig_De, . . . ). The device's signature is generated by the device by IBS using a secret key (SKID) of the device and a GPK.

In another embodiment as described in process 500, step 1115 may be modified such that the Authentication Message includes Authentication Type (Auth. Type) 250, Service Provider network's ID (SP_ID), Device's ID (Device_ID), device's DH public key (A), and the device's signature (Sig_De). A possible message format is given as follows: (Auth. Type, SP_ID, Device_ID, A, Sig_De, . . . ).

In step 1120, process 1100 receives an Authentication Response Message from the service provider 230. The Authentication Response Message includes the authentication unit's ID (denoted by SP_ID), the random number received from the device (RAND1), an encrypted message m, and the authentication unit's signature (denoted by Sig_SP). The encrypted message m is derived by the authentication unit of the service provider 230 by encrypting RAND2 using Device_ID based on IBE, and can be expressed in the following manner: m=En(RAND2, Device_ID).

In step 1125, process 1100 authenticates the service provider 230 by verifying its signature (Sig_SP). If authentication is successful, process 1100 decrypts the message m with the device's private key to get RAND2 and derives the key (K_ser) using the pre-defined KDF. The input parameters of the KDF include RAND1 and RAND2, and can be expressed in the following manner: K_ser=KDF(RAND1, RAND2, . . . ).

In step 1130, process 1100 saves the key (K-ser), RAND1 and RAND2 in the memory. Then process 1100 generates and transmits Message Authentication Code (MAC) to the service provider 230. The MAC is generated by using a MAC generation function with RAND2 and K_ser as the input.

Steps 1115-1130 pertain to the third type of authentication where the device authenticates with the service provider 230.

In step 1140, process 1100 sends an Authentication Message to an Authentication Node (AN) of the operator provider 220. The Authentication Message includes Authentication Type (Auth. Type) 250, Device's ID (Device_ID), RAND1, and the device's signature (Sig_De). A possible message format is given as follows: (Auth. Type, Device_ID, RAND1, Sig_De, . . . ). The device's signature is generated by the device by IBS using a secret key (SKID) of the device and a GPK.

In step 1145, process 1100 receives an Authentication Response Message from the operator provider 220. The Authentication Response Message includes the AN's ID (denoted by AN_ID), the random number received from the device (RAND1), an encrypted message m, and the AN's signature (denoted by Sig_AN). The encrypted message m is derived by the operator provider by encrypting RAND2 using Device_ID based on IBE and can be expressed in the following manner: m1=En(RAND2, Device_ID).

In step 1150, in response to receiving the Authentication Response Message from the AN, process 1100 authenticates the AN by verifying AN's signature (Sig_AN). Particularly, the device verifies the signature of the AN (Sig_AN) using the AN's ID (AN_ID) and a GPK. If authentication is successful, process 1100 decrypts the message m with the device's private key to get RAND2 and derives the key (K_com) using the pre-defined KDF. The input parameters of the KDF shall include RAND1 and RAND2, and can be expressed in the following manner: K_com=KDF(RAND1, RAND2, . . . ).

In step 1155, process 1100 saves the key (K-com), RAND1 and RAND2 in the memory. Then process 1100 generates and transmits Message Authentication Code (MAC) to the service provider 230. The MAC is generated by using a MAC generation function with RAND2 and K_com as the input.

Steps 1140-1155 pertain to the second type of authentication where the device authenticates with the operator provider 220.

In step 1160, process 1100 sends an Authentication Message to an Authentication Node (AN) of the operator provider 220. The Authentication Message includes Authentication Type (Auth. Type) 250, Service Provider network's ID (SP_ID), Device's ID (Device_ID), RAND1, and the device's signature (Sig_De). A possible message format is given as follows: (Auth. Type, SP_ID, Device_ID, RAND1, Sig_De, . . . ).

In step 1165, process 1100 receives a first Authentication Response Message from either the operator provider 220 or the service provider 230. For purpose of this discussion, we shall assume that the first Authentication Response Message is from the operator provider 220 and a second Authentication Response Message is from the service provider 230.

The first Authentication Response Message includes the AN's ID (denoted by AN_ID), the random number received from the device (RAND1), an encrypted message m1, and the AN's signature (denoted by Sig_AN). The encrypted message m1 is derived by the operator provider 220 by encrypting RAND2 using Device_ID based on IBE and can be expressed in the following manner: m1=En(RAND2, Device_ID).

In another embodiment as described in process 400, step 1165 may be modified such that the first Authentication Response Message includes the AN's ID (denoted by AN_ID), the random number received from the device (RAND1), an encrypted message m1, and the AN's signature (denoted by Sig_AN). The encrypted message m1 is obtained by encrypting RAND2 using K_C and can be expressed in the following manner: m1=En(RAND2, K_C).

In another embodiment as described in process 500, step 1165 may be modified such that the first Authentication Response Message includes the AN's ID (denoted by AN M), the device's DH public key received from the device (A), the authentication node's DH public key (B), and the AN's signature (denoted by Sig_AN).

The second Authentication Response Message includes the authentication unit's ID (denoted by SP_ID), the random number received from the device (RAND1), an encrypted message m2, and the authentication unit's signature (denoted by Sig_SP). The encrypted message m2 is derived by the authentication unit by encrypting RAND3 using Device_ID based on IBE, and can be expressed in the following manner: m2=En(RAND3, Device_ID).

In another embodiment as described in process 400, step 1165 may be modified such that the second Authentication Response Message includes the authentication unit's ID (denoted by SP_ID), the random number received from the device (RAND1), an encrypted message m2, and the authentication unit's signature (denoted by Sig_SP). The encrypted message m2 is obtained by encrypting RAND3 using K_S and can be expressed in the following manner: m2=En(RAND3, K_S).

In another embodiment as described in process 500, step 1165 may be modified such that the second Authentication Response Message includes the authentication unit's ID (denoted by SP_ID), the device's DH public key received from the device (A), the authentication unit's DH public key (C), and the authentication unit's signature (denoted by Sig_SP).

In step 1170, in response to receiving the first Authentication Response Message from the operator provider 220, process 1100 authenticates the operator provider 220 by verifying AN's signature (Sig_AN). Particularly, the device verifies the signature of the AN (Sig_AN) using the AN's ID (AN_ID) and a GPK. If authentication is successful, process 1100 decrypts the message m1 with the device's private key to obtain RAND2 and derives the key (K_com) using the pre-defined KDF. The input parameters of the KDF shall include RAND1 and RAND2, and can be expressed in the following manner: K_com=KDF(RAND1, RAND2, . . . ).

In another embodiment as described in process 400, step 1170 may be modified such that after process 1100 successfully authenticates with the AN by verifying AN's signature (Sig_AN), process 1100 decrypts the message m1 with K_C to get RAND2. Then, process 1100 derives the key (K_com) using the pre-defined KDF. The input parameters of the KDF include RAND1 and RAND2, and can be expressed in the following manner: K_com=KDF(RAND1, RAND2, . . . ).

In another embodiment as described in process 500, step 1170 may be modified such that after process 1100 successfully authenticates with the AN by verifying AN's signature (Sig_AN), process 1100 derives the key (K_com) using the received DH public key, i.e., K_com=BRAND2 mod p.

In step 1170, in response to receiving the second Authentication Response Message from the operator provider 220 or directly from the service provider 230, process 1100 authenticates the service provider 230 by verifying its signature (Sig_SP). If authentication is successful, process 1100 decrypts the message m2 with its private key to get RAND3 and derives the key (K_ser) using the pre-defined KDF. The input parameters of the KDF shall include RAND1 and RAND3, and can be expressed in the following manner: K_ser=KDF(RAND1, RAND3, . . . ).

In another embodiment as described in process 400, step 1170 may be modified such that after process 1100 successfully authenticates with the service provider 230 by verifying its signature (Sig_SP), process 1100 decrypts the message m2 with its private key to get RAND3 and derives the key (K_ser) using the pre-defined KDF. The input parameters of the KDF shall include RAND1 and RAND3, and can be expressed in the following manner: K_ser=KDF(RAND1, RAND3, . . . ).

In another embodiment as described in process 500, step 1170 may be modified such that after process 1100 successfully authenticates with the service provider 230 by verifying its signature (Sig_SP), process 1100 derives the key (K_ser) using the received DH public key, i.e., K_ser=CRAND1 mod p.

In step 1175, process 1100 saves a first credential for the operator provider 220 or a second credential for the service provider 230 in the memory depending on whether the device receives a first or second Authentication Response Message in step 1165. The first credential includes key (K_com). The second credential includes key (K_ser).

In step 1180, process 1100 generates and transmits a first Message Authentication Code (MAC1) to the operator provider 220 and a second Message Authentication Code MAC2 to the service provider 230 depending on whether the device receives a first or second Authentication Response Message in step 1165. The MAC1 is generated using a MAC generation function with RAND2 and K_com as the input. The MAC2 is generated using a MAC generation function with RAND3 and K_ser as the input.

In step 1185, process 1100 determines whether two Authentication Response Messages have been received. If both Authentication Response Messages have been received, process 1100 ends. Otherwise, process 1100 repeats from step 1165 and awaits for the second Authentication Response.

Figure 12:
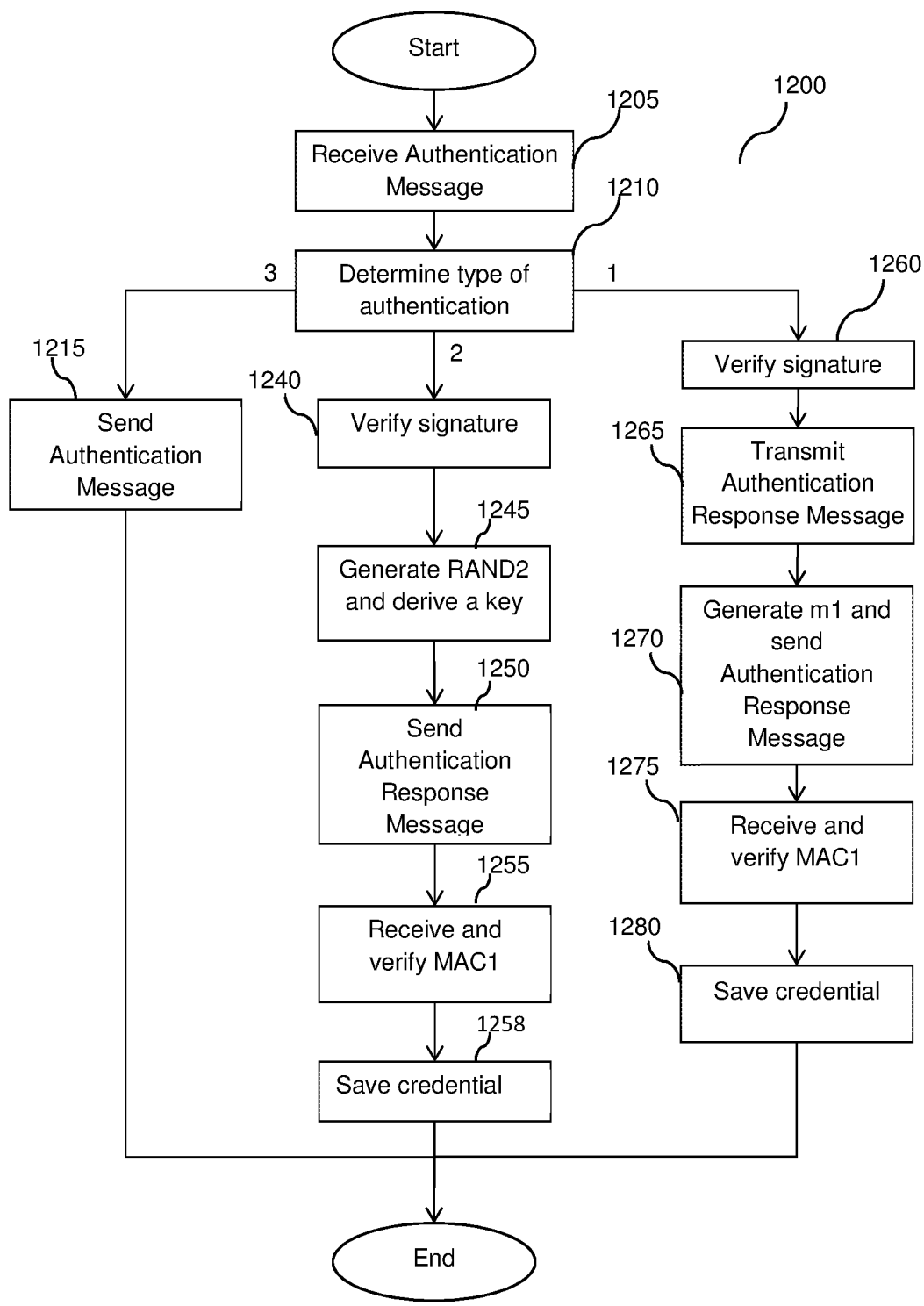
FIG. 12 illustrating a process 1200 performed by the Authentication Node of the operator provider 220 in accordance with an embodiment of this disclosure.

FIG. 12 illustrates a process 1200 performed by the Authentication Node of the operator provider 220. Process 1200 begins with step 1205 by receiving an Authentication Message from the device 210.

In step 1210, process 1200 determines the type of authentication based on Authentication Type (Auth. Type) 250. If the Auth. Type indicates 1, process 1200 determines the first type of authentication and proceeds to step 1260 thereafter. If the Auth. Type indicates 2, process 1200 determines the second type of authentication and proceeds to step 1240 thereafter. If the Auth. Type indicates 3, process 1200 determines the third type of authentication and proceeds to step 1215 thereafter.

In step 1215, process 1200 forwards the Authentication Message to the Authentication Unit of the service provider 230.

In step 1240, process 1200 verifies the signature of the device (Sig_De) using the device's ID (Device_ID) based on IBS. Particularly, the authentication node verifies the signature of the device (Sig_De) using the device's ID (Device_ID) and a GPK. If verification is successful, process 1200 generates a random number (RAND2) and derives a key (denoted as K_com) using a pre-defined key derivation function (KDF) in step 1245. The input parameters of the KDF include RAND1 and RAND2, and can be expressed in the following manner: K_com=KDF(RAND1, RAND2, . . . ).

In step 1250, process 1200 generates an encrypted message m1 and sends an Authentication Response Message to the device 210. The encrypted message m1 is obtained by encrypting RAND2 using Device_ID based on IBE and can be expressed in the following manner: m1=En(RAND2, Device_ID). The Authentication Response Message includes the AN's ID (denoted by AN_ID), the random number received from the device (RAND1), the encrypted message m1, and the AN's signature (denoted by Sig_AN).

The AN's signature is generated by the AN by IBS using a secret key (SKID) of the AN and a GPK.

In step 1255, process 1200 receives a MAC1 from the device 210. In response, process 1200 verifies the MAC1 by generating a MAC using the same MAC generation function with RAND2 and K_com as the input, and see whether MAC1 is equal to MAC. If MAC is equal to MAC1, process 1200 saves K_com, RAND1 and RAND2 in the memory in step 1258. One skilled in the art will recognise that the Authentication Node may derive the key (denoted as K-com) in this step instead of step 1245. Particularly, upon receipt of MAC1, the Authentication Node derives the key (denoted as K-com) prior to verifying MAC1.

In step 1260, process 1200 verifies the signature of the device (Sig_De) using the device's ID (Device_ID) based on IBS. Particularly, the authentication node verifies the signature of the device (Sig_De) using the device's ID (Device_ID) and a GPK. If verification is successful, process 1200 generates a random number (RAND2) and derives a key (denoted as K_com) using a pre-defined key derivation function (KDF). The input parameters of the KDF include RAND1 and RAND2, and can be expressed in the following manner: K_com=KDF(RAND1, RAND2, . . . ).

In step 1265, process 1200 forwards the Authentication Message to the Authentication Unit of the service provider. One skilled in the art will recognise that step 1265 may take place before step 1260 without departing from this disclosure.

In step 1270, process 1200 generates an encrypted message m1 and sends an Authentication Response Message to the device 210. The encrypted message m1 is obtained by encrypting RAND2 using Device_ID based on IBE and can be expressed in the following manner: m1=En(RAND2, Device_ID). The Authentication Response Message includes the AN's ID (denoted by AN_ID), the random number received from the device (RAND1), the encrypted message m1, and the AN's signature (denoted by Sig_AN). The AN's signature is generated by the AN by IBS using a secret key (SKID) of the AN and a GPK.

In step 1275, process 1200 receives MAC1 from the device 210. In response, process 1200 verifies MAC1. To verify the MAC1, the AN generates a MAC using the same MAC generation function with RAND2 and K_com as the input, and see whether MAC1 is equal to MAC. If MAC1 is equal to MAC, process 1200 saves K-com in the memory in step 1280. One skilled in the art will recognise that the Authentication Node may derive the key (denoted as K-com) in this step instead of step 1260. Particularly, upon receipt of MAC1, the Authentication Node derives the key (denoted as K-com) prior to verifying MAC1.

Process 1200 ends after step 1280.

Figure 13:
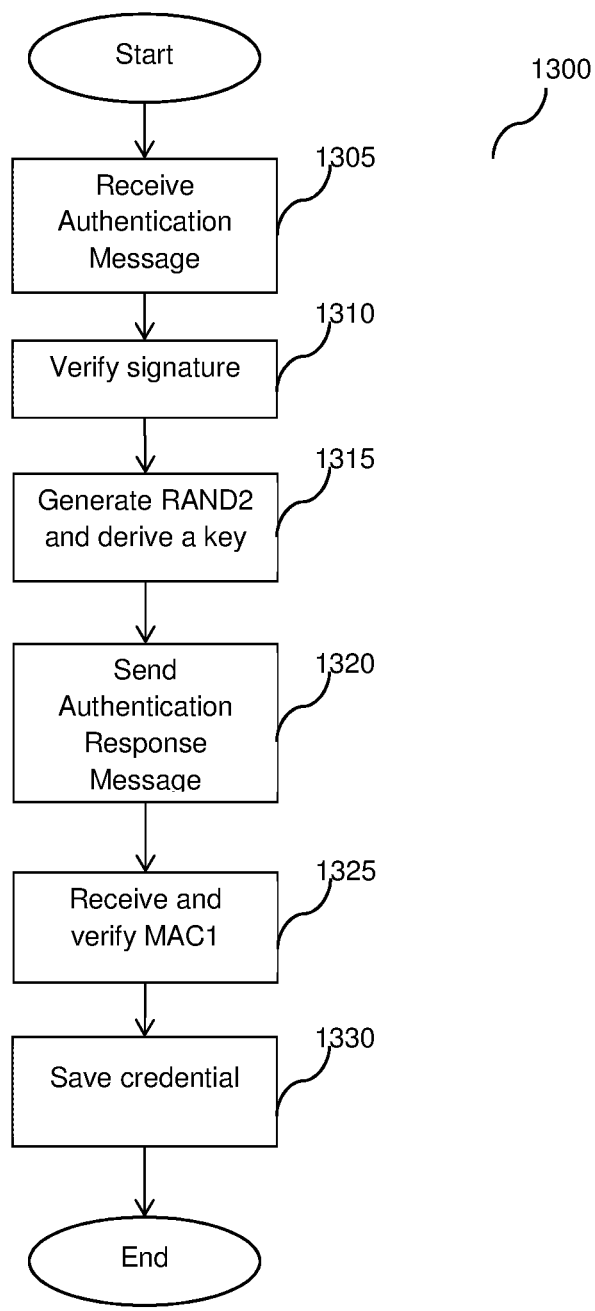
FIG. 13 illustrating a process 1300 performed by the Authentication Unit of the service provider 230 in accordance with an embodiment of this disclosure.

FIG. 13 illustrates a process 1300 performed by the Authentication Unit of the service provider 230. Process 1300 begins with step 1305 by receiving an Authentication Message from the AN. The Authentication Message includes Authentication Type (Auth. Type) 250, Service Provider network's ID (SP_ID) Device's ID (Device_ID), RAND1, and the device's signature (Sig_De). A possible message format is given as follows: (Auth. Type, SP_ID, Device_ID, RAND1, Sig_De, . . . ).

In step 1310, process 1300 verifies the signature of the device (Sig_De) using the device's ID (Device_ID) based on IBS. Particularly, the authentication unit verifies the signature of the device (Sig_De) using the device's ID (Device_ID) and a GPK. If verification is successful, process 1300 generates a random number (RAND2) and derives a key (denoted as K_ser) using a pre-defined key derivation function (KDF) in step 1315. The input parameters of the KDF shall include RAND1 and RAND2, and can be expressed in the following manner: K_ser=KDF(RAND1, RAND2, . . . ).

In step 1320, process 1300 generates an encrypted message (m) and sends an Authentication Response Message to the device 210. The encrypted message m is obtained by encrypting RAND2 using Device_ID based on IBE, and can be expressed in the following manner: m=En(RAND2, Device_ID). The Authentication Response Message includes the authentication unit's ID (denoted by SP_ID), the random number received from the device (RAND1), the encrypted message m, and the authentication unit's signature (denoted by Sig_SP). The authentication unit's signature is generated by the authentication unit by IBS using a secret key (SKID) of the authentication unit and a GPK.

In step 1325, process 1300 receives MAC1 from the device 210. In response, process 1300 verifies MAC1. To verify the MAC1, process 1300 generates a MAC using the same MAC generation function with RAND2 and K_ser as the input, and see whether MAC1 is equal to MAC. If MAC1 is equal to MAC, process 1300 saves the credential comprising K_ser in the memory in step 1330. One skilled in the art will recognise that the Authentication Unit may derive the key (denoted as K-ser) in this step instead of step 1315. Particularly, upon receipt of MAC1, the Authentication Unit derives the key (denoted as K_ser) prior to verifying MAC1.

Process 1300 ends after step 1330.

To summarise, if a device 210 wants to authenticate with operator and/or service provider networks, the device generates and transmits an authentication data package to the operator provider network. The authentication data package includes the Authentication Message comprising Authentication Type (Auth. Type), Service Provider network's ID (SP_ID), Device's ID (Device_ID), RAND1, and the device's signature (Sig_De).

In response to receiving the authentication data package, the operator provider network determines the type of authentication. If the authentication is the first or third type, the operator provider network would forward the authentication data package to the service provider network. Both operator and network provider networks would handle the authentication data package accordingly by first authenticating the device by verifying the device's signature (Sig_De). Particularly, the operator and network provider networks verify the signature of the device (Sig_De) using the Device's ID (Device_ID) and a GPK. If verification is successful, the operator and network provider networks generate RAND2 and RAND3 respectively. Thereafter, the operator and network provider networks generate K_com (using KDF with RAND1 and RAND2) and K-ser (using KDF with RAND1 and RAND3) respectively. The random numbers (RAND2 and RAND3) are encrypted by IBE using the device's ID and transmitted to the device with respectively signatures (Sig_AN and Sig_SP). Alternatively, the session keys, K-com and K-ser, may be generated after the operator and network provider receives MAC1 and MAC2.

In response to receiving the encrypted random number from the operator and service provider networks, the device verifies the signatures using the respective identity (Sig ID and SP_ID). If verification is successful, the device decrypts the random numbers (RAND2 and RAND3) and derives a first session key for the operator provider network using RAND2 and RAND1, and a second session key for the service provider network using RAND3 and RAND1.

The device then generates a first Message Authentication Code (MAC1) using a MAC generation function with RAND2 and K_com as the input to the operator provider network and a second Message Authentication Code (MAC2) using a MAC generation function with RAND3 and K_ser as the input to the service provider network. MAC1 and MAC2 are then transmitted to the operator provider network.

In response to receiving MAC1 and MAC2, the operator provider network first verifies the MAC1. In the alternative embodiment, the operator and network provider networks generate K_com and K-ser prior to verifying MAC1 and MAC2 respectively. If verification is successful, the operator provider network saves the first session key and forwards MAC2 to the service provider network. In response to receiving MAC2, the service provider network verifies MAC2. If verification is successful, the operator provider network saves the second session key.

The first and second session keys, K-com and K-ser, are used by the device to communicate with the operator and service provider networks respectively.

The proposed method can be applied to all communication systems that require both network access authentication and service authentication, including all three major application scenarios of the 5G communication systems: eMBB (enhanced Mobile BroadBand), mIoT (massive Internet of Things), uRLLC (Ultra Reliable Low Latency Communication).

The proposed unified network and service authentication uses one authentication data package for generating two sets of session keys (one set for network, another set for service) which can effectively separate the information between the network operator and the service provider.

It is noted that the UEs, devices, various elements of the operator provider network and various elements of the service provider network are widely known. Hence, for brevity, the operating systems, configurations, structures, assemblies, etc of each of the UEs, devices, elements of the operator provider network and elements of the service provider network are omitted. Importantly, the method and system in accordance with embodiments of the invention is provided in the form of instructions stored on storage medium and executable by processors of respective UE, devices, elements of the operator provider network such as the Authentication Node and elements of the service provider network such a Authentication Unit.

The above is a description of embodiments of a method and system of a unified authentication framework for authenticating with an operator provider and/or a service provider. It is foreseeable that those skilled in the art can and will design alternative method and system based on this disclosure that infringe upon this invention as set forth in the following claims.

What is claimed is:

1. A unified authentication method for a device to authenticate a first provider network and a second provider network based on Identity-Based Cryptography where each of the device, the first provider network and the second provider network has a different private key and a same Global Public Key (GPK) issued by a public key generator, the unified authentication method comprising:

generating and transmitting, by the device, an authentication data package to the first provider network, the authentication data package includes an Authentication Type (Auth. Type), the second provider network's ID (SP_ID), a first random number (RAND1), an identity of a device (Device_ID), and a signature of the device (Sig_De), wherein the device generates the RAND1, and wherein the device sends an authentication message to an Authentication Node (AN) of the first provider network that includes at least each of and is formatted in the order of Auth. Type, SP_ID, Device_ID, RAND1, and Sig_De, and wherein the Auth. Type comprises a first type wherein authentication involves an element of the first provider network and an element of the second provider network, a second type wherein authentication involves the element of the first provider network, and a third type wherein authentication involves the element of the second provider network;

in response to receiving the authentication data package, determining, by the element of the first provider network, a type of authentication based on the Authentication Type;

in response to determining the first type of authentication, generating and transmitting, by the element of the first provider network, a first Authentication Response Message to the device and transmitting the authentication data package to the element of the second provider network based on the SP_ID; and in response to receiving the authentication data package, generating and transmitting, by the element of the second provider network, a second Authentication Response Message to the device.

2. The unified authentication method according to claim 1, wherein the step of generating and transmitting, by the element of the first provider network, the first Authentication Response Message to the device comprises:

verifying the Sig_De using the Device_ID and the GPK; and in response to verification being successful, generating a second random number (RAND2); and generating a first encrypted message (m1) containing the RAND2 using the Device_ID based on Identity Based Encryption (IBE);

generating a signature (Sig_AN) using the secret key of the first provider network and a GPK; and transmitting the first Authentication Response Message to the device, wherein the first Authentication Response Message includes an identity of the first provider network (AN_ID), the RAND1, the m1, and the Sig_AN.

3. The unified authentication method according to claim 2 further comprising:

the device, in response to receiving the first Authentication Response Message, performing the following steps:

authenticating the first provider network by verifying the Sig_AN using AN_ID and the GPK;

in response to authentication being successful, decrypting m1 with the secret key of the device to obtain the RAND2;

deriving a first session key (K_com) using the predefined KDF with input parameters being the RAND1 and the RAND2;

saving the first session key in the memory of the device;

generating a first Message Authentication Code (MAC1) using a MAC generation function with the RAND2 and the K_com as the input; and transmitting MAC1 to the element of the first provider network.

4. The unified authentication method according to claim 3 further comprising:

the element of the first provider network, in response to receiving the MAC1, performing the following steps:

deriving the first session key (K_com) using a pre-defined Key Derivation Function (KDF) with input parameters being the RAND1 and the RAND2;

generating a MAC using the same MAC generation function with the RAND2 and the K_com as the input;

determining whether MAC1 is equal to MAC; and in response to MAC1 being equal to MAC, saving the K_com in a memory of the element of the first provider network.

5. The unified authentication method according to claim 4 wherein the step of generating and transmitting, by the element of the second provider network, the second Authentication Response Message to the device comprises:

verifying the Sig_De using the Device_ID and the GPK; and in response to verification being successful, generating a third random number (RAND3); and generating a second zencrypted message (m2) containing the RAND3 using the Device_ID based on Identity Based Encryption (IBE);

generating a signature (Sig_SP) using the secret key of the second provider network and the GPK; and transmitting the second Authentication Response Message to the device, wherein the second Authentication Response Message includes an identity of the second provider network (SP_ID), the RAND1, the m2, and the Sig_SP.

6. The unified authentication method according to claim 5 further comprising:

the device, in response to receiving the second Authentication Response Message, performing the following steps:

authenticating the second provider network by verifying the Sig_SP using the SP_ID and the GPK;

in response to authentication being successful, decrypting m2 with the secret key of the device to obtain the RAND3;

deriving a second session key (K_ser) using the pre-defined KDF with input parameters being the RAND1 and the RAND3;

saving the second session key in the memory of the device;

generating a second Message Authentication Code (MAC1) using a MAC generation function with the RAND3 and the K_ser as the input; and transmitting the MAC2 to the element of the second provider network.

7. The unified authentication method according to claim 6 further comprising:

the element of the second provider network, in response to receiving the MAC2, performing the following steps:

deriving the second session key (K_ser) using the pre-defined Key Derivation Function (KDF) with input parameters being the RAND1 and the RAND3;

generating a MAC using the same MAC generation function with the RAND3 and the K_ser as the input;

determining whether MAC2 is equal to MAC; and in response to MAC2 being equal to MAC, saving the K_ser in a memory of the element of the second provider network.

8. The unified authentication method according to claim 1 further comprising:

in response to determining the second type of authentication, generating and transmitting, by the element of the first provider network, a third Authentication Response Message to the device.

9. The unified authentication method according to claim 8 wherein the step of generating and transmitting, by the element of the first provider network, the third Authentication Response Message to the device comprises:

verifying the Sig_De using the Device_ID and the GPK; and in response to verification being successful, generating a second random number (RAND2);

generating a first encrypted message (m1) containing the RAND2 using the Device_ID based on Identity Based Encryption (IBE);

generating a signature (Sig_AN) using the secret key of the first provider network and a GPK; and transmitting the third Authentication Response Message to the device, wherein the third Authentication Response Message includes an identity of the element of the first provider network (AN_ID), the RAND1, the m1, and the Sig_AN.

10. The unified authentication method according to claim 9 further comprising:

the device, in response to receiving the third Authentication Response Message, performing the following steps:

authenticating the first provider network by verifying the Sig_AN using the AN_ID and the GPK;

in response to authentication being successful, decrypting the m1 with the secret key of the device to obtain the RAND2;

deriving the session key (K_com) using the pre-defined KDF with input parameters being the RAND1 and the RAND2;

saving the session key in the memory of the device;

generating a first Message Authentication Code (MAC1) using a MAC generation function with the RAND2 and the K_com as the input; and transmitting the MAC1 to the element of the first provider network.

11. The unified authentication method according to claim 10 further comprising:

the element of the first provider network, in response to receiving the MAC1, performing the following steps:

deriving the session key (K_com) using a pre-defined Key Derivation Function (KDF) with input parameters being the RAND1 and the RAND2;

generating a MAC using the same MAC generation function with the RAND2 and the K_com as the input;

determining whether MAC1 is equal to MAC; and in response to MAC1 being equal to MAC, saving the K_com in a memory of the element of the first provider network.

12. The unified authentication method according to claim 1 further comprising:

in response to determining the third type of authentication, transmitting, by the element of the first provider network, the authentication data package to the element of the second provider network.

13. The unified authentication method according to claim 12;

wherein the step of generating and transmitting, by the element of the second provider network, the second Authentication Response Message to the device comprises:

verifying the Sig_De using the Device_ID and the GPK; and in response to verification being successful, generating a third random number (RAND3);
generating a second encrypted message (m2) containing RAND3 using the Device_ID based on Identity Based Encryption (IBE);
generating a signature (Sig_SP) using the secret key of the second provider network and the GPK; and
transmitting the second Authentication Response Message to the device, wherein the second Authentication Response Message includes an identity of the second provider network (SP_ID), the RAND1, the m2, and the Sig_SP.

14. The unified authentication method according to claim 13 further comprising:
the device, in response to receiving the second Authentication Response Message, performing the following steps:
authenticating the second provider network by verifying the Sig_SP using the SP_ID and the GPK;
in response to authentication being successful, decrypting the m2 with the secret key of the device to obtain the RAND3;
deriving a second session key (K_ser) using the pre-defined KDF with input parameters being the RAND1 and the RAND3;
saving the second session key in the memory of the device;
generating a second Message Authentication Code (MAC1) using a MAC generation function with the RAND3 and the K_ser as the input; and
transmitting the MAC2 to the element of the second provider network.

15. The unified authentication method according to claim 14 further comprising:
the element of the second provider network, in response to receiving the MAC2, performing the following steps:
deriving the second session key (K_ser) using the pre-defined KDF with input parameters being the RAND1 and the RAND3;
generating a MAC using the same MAC generation function with the RAND3 and the K_ser as the input;
determining whether MAC2 is equal to MAC; and
in response to MAC2 being equal to MAC, saving the K_ser in a memory of the element of the second provider network.

16. A device for an authentication framework involving the device, a first provider network and a second provider network based on an Identity-Based Cryptography where each of the device, an element of the first provider network and an element of the second provider network has a different private key and a same Global Public Key (GPK) issued by a public key generator, the device comprising:
a processor, a memory, and instructions stored on the memory and executable by the processor to:
generate an Authentication Type (Auth. Type) wherein the Auth. Type comprises a first type wherein authentication involves the element of the first provider network and the element of the second provider network, a second type wherein authentication involves the element of the first provider network, and a third type wherein authentication involves the element of the second provider network;
generate an authentication data package, wherein the authentication data package includes the Auth. Type, the second provider network's ID (SP_ID), a first random number (RAND1), an identity of a device (Device_ID), and a signature of the device (Sig_De), wherein the device generates the RAND1, and wherein the device sends an authentication message to an Authentication Node (AN) of the first provider network that includes at least each of and is formatted in the order of Auth. Type, SP_ID, Device_ID, RAND1, and Sig_De; and
transmit the authentication data package to the element of the first provider network.

17. The device according to claim 16 wherein the instructions further comprise instructions to:
generate the first random number (RAND1);
generate the device's signature (Sig_De), wherein the authentication data package further includes the RAND1, the Device_ID and the Sig_De.

18. The device according to claim 17 wherein the instructions further comprise, in response to the Auth. Type being the first or second type of authentication, instructions to:
receive a first Authentication Response Message from the element of the first provider network, wherein the first Authentication Response Message includes an identity of the first provider network (AN_ID), the RAND1, a first encrypted message (m1) generated by the element of the first provider network containing a second random number (RAND2) using the Device_ID based on Identity Based Encryption (IBE), and a signature (Sig_AN) using the secret key of the first provider network and the GPK;
authenticate the first provider network by verifying the Sig_AN using the AN_ID and the GPK;
in response to authentication being successful, decrypt the m1 with the secret key of the device to obtain the RAND2;
derive the first session key (K_com) using the pre-defined KDF with input parameters being the RAND1 and the RAND2;
save the first session key in the memory of the device;
generate a first Message Authentication Code (MAC1) using a MAC generation function with the RAND2 and the K_com as the input; and
transmit the MAC1 to the element of the first provider network.

19. The device according to claim 18 wherein the instructions further comprise, in response to the Auth. Type being the first type of authentication, instructions to:
receive a second Authentication Response Message from the element of the second provider network, wherein the second Authentication Response Message includes an identity of the SP_ID, the RAND1, a second encrypted message (m2) generated by the element of the second provider network containing a third random number (RAND3) using the Device_ID based on Identity Based Encryption (IBE), and a signature (Sig_SP) using the secret key of the second provider network and the GPK;
authenticate the second provider network by verifying the Sig_SP using the SP_ID and the GPK;
in response to authentication being successful, decrypt the m2 with the secret key of the device to obtain the RAND3;
derive the second session key (K_ser) using the pre-defined KDF with input parameters being the RAND1 and the RAND3;
save the second session key in the memory of the device;
generate a second Message Authentication Code (MAC1) using a MAC generation function with the RAND3 and the K_ser as the input; and transmit the MAC2 to the element of the second provider network.

20. The device according to claim 19 wherein the instructions further comprise, in response to the Auth. Type being the third type of authentication, instructions to:
- receive an Authentication Response Message from the element of the second provider network, wherein the Authentication Response Message includes an identity of the SP_ID, the RAND1, an encrypted message (m) generated by the element of the second provider network containing the second random number (RAND2) using the Device_ID based on Identity Based Encryption (IBE), and the signature (Sig_SP) using the secret key of the service provider network and the GPK;
- authenticate the second network provider by verifying the Sig_SP using the SP_ID and the GPK;
- in response to authentication being successful, decrypt the m2 with the secret key of the device to obtain the RAND2;
- derive the second session key (K_ser) using the pre-defined KDF with input parameters being the RAND1 and the RAND2;
- save the second session key in the memory of the device;
- generate a Message Authentication Code (MAC) using a MAC generation function with the RAND2 and the K_ser as the input; and
- transmit the MAC to the element of the second provider network.

* * * * *